(12) United States Patent
Tanio et al.

(10) Patent No.: US 11,831,347 B2
(45) Date of Patent: Nov. 28, 2023

(54) PARAMETER DETERMINATION APPARATUS, SIGNAL TRANSMISSION APPARATUS, PARAMETER DETERMINATION METHOD, SIGNAL TRANSMISSION METHOD AND RECORDING MEDIUM

(71) Applicant: NEC Corporation, Tokyo (JP)

(72) Inventors: Masaaki Tanio, Tokyo (JP); Norifumi Kamiya, Tokyo (JP); Naoto Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/641,187

(22) PCT Filed: Sep. 2, 2020

(86) PCT No.: PCT/JP2020/033192
§ 371 (c)(1),
(2) Date: Mar. 8, 2022

(87) PCT Pub. No.: WO2021/054118
PCT Pub. Date: Mar. 25, 2021

(65) Prior Publication Data
US 2022/0345163 A1 Oct. 27, 2022

(30) Foreign Application Priority Data
Sep. 18, 2019 (JP) .................. 2019-169715

(51) Int. Cl.
*H04B 1/04* (2006.01)
*G06N 3/08* (2023.01)

(52) U.S. Cl.
CPC .............. *H04B 1/0475* (2013.01); *G06N 3/08* (2013.01)

(58) Field of Classification Search
CPC ................ H04B 1/0475; H04B 1/0483; H04B 10/2507; G06N 3/08

(Continued)

(56) References Cited

U.S. PATENT DOCUMENTS

| 5,272,723 A * | 12/1993 | Kimoto | H04L 25/03165 375/232 |
| 10,581,469 B1 * | 3/2020 | O'Shea | G06N 3/04 |
| 11,018,704 B1 * | 5/2021 | O'Shea | H04B 1/0475 |
| 11,431,300 B2 * | 8/2022 | Barbu | H03F 3/19 |

(Continued)

FOREIGN PATENT DOCUMENTS

| JP | H07-121494 A | 5/1995 |
| JP | H08-249007 A | 9/1996 |

(Continued)

OTHER PUBLICATIONS

International Search Report for PCT Application No. PCT/JP2020/033192, dated Dec. 8, 2020.

(Continued)

*Primary Examiner* — Emmanuel Bayard

(57) ABSTRACT

A parameter determination apparatus (2) includes: a first learning device (2111) learning a weight between a [j−1]-th layer (j is an integer that satisfies a condition that "2≤j≤the number of the layer") and a [j]-th layer to which an output of the [j−1]-th layer is inputted among a plurality of layers of a neural network; a selecting device (2112) selecting at least one valid path for each node included in the [j]-th layer from a plurality of connection paths that connect nodes in the [j−1]-th layer and nodes in the [j]-th layer, respectively, on the basis of the weight learned by the first learning device; and a second learning device (2113) learning at least one of the weight and a bias as the parameters relating to a network structure between the [j−1]-th layer and the [j]-th layer on the basis of the sample signal, the label signal and the valid path.

29 Claims, 13 Drawing Sheets

(58) Field of Classification Search
USPC .................................................. 375/295–297
See application file for complete search history.

(56) References Cited

U.S. PATENT DOCUMENTS

| | | | |
|---|---|---|---|
| 2007/0075770 A1* | 4/2007 | Long | H03F 1/02 |
| | | | 330/149 |
| 2013/0343483 A1* | 12/2013 | Bai | H03F 1/3247 |
| | | | 375/297 |
| 2019/0294972 A1* | 9/2019 | Keller | G06N 3/048 |
| 2020/0134439 A1* | 4/2020 | Turner | G06N 3/048 |
| 2020/0151065 A1* | 5/2020 | Rinaldi | G06F 11/2089 |
| 2020/0249674 A1* | 8/2020 | Dally | G05D 1/0088 |
| 2020/0372076 A1* | 11/2020 | Li | G06F 16/9035 |
| 2020/0395042 A1* | 12/2020 | Hanazawa | G06N 3/084 |
| 2022/0200540 A1* | 6/2022 | Kof | H03F 1/3247 |

FOREIGN PATENT DOCUMENTS

| | | |
|---|---|---|
| JP | H11-134003 A | 5/1999 |
| JP | 2009-064216 A | 3/2009 |

OTHER PUBLICATIONS

Zhijian Yu, "A Generalized Digital Predistortion Model Based on Artificial Neural Networks", Proceedings of 2018 Asia-Pacific Microwave Conference, pp. 935-937, Nov. 2018.

J.Kim, K.Konstantinou, "Digital Predistortion of wide band signals based on power amplifier with memory", IET Electron Letter, vol. 37 No. 23, pp. 1417-1418, Nov. 2001.

Dennis R.Morgan, Zhengxiang Ma, Jaehyeong Kim, Michael G.Zierdt, Hohn Pastalan, "A Generalized Memory Polynomial Model for Digital Predistortion of RF Power Amplifiers", IEEE Transaction on Signal Processing, vol. 54 No. 10, pp. 3852-3860, Oct. 2006.

Meenakshi Rawat, Fadhel M.Ghannouchi, "A Mutual Distortion and Impairment Compensator for Wideband Direct-Conversion Transmitters Using Neural Networks", IEEE Transaction on Broadcast, vol. 58 No. 2, pp. 168-177, Jan. 2012.

Song Han, Jeff Pool, John Tran, William J.Dally, "Learning both Weights and Connections for Efficient Neural Networks", In Advances in Neural Information Processing Systems, 2015, pp. 1-9.

Alieza Aghasi, Nam Nguyen, Justin Romberg, "Net-Trim: A Layer-wise Convex Pruning of Deeep Neural Networks", arXiv preprint arXiv:1611.05162, 2016, pp. 1-40.

Jessica Chani-Cahuana, Per Niklas Landin, Christian Fager, Thomas Eriksson, "Iterative Learning Control for RF Power Amplifier Linearization", IEEE Transaction on Microwave Theory and Techniques, vol. 64 No. 9. pp. 2778-2789, Sep. 2016.

Atsushi Yamaguchi et al., "DNN Compaction Method Eliminating Zero Weight Coefficients", Toshiba Review, Jul. 2019, vol. 74, No. 4, pp. 42-45, ISSN 2432-1168.

* cited by examiner

PARAMETER DETERMINATION APPARATUS, SIGNAL TRANSMISSION APPARATUS, PARAMETER DETERMINATION METHOD, SIGNAL TRANSMISSION METHOD AND RECORDING MEDIUM

This application is a National Stage Entry of PCT/JP2020/033192 filed on Sep. 2, 2020, which claims priority from Japanese Patent Application 2019-169715 filed on Sep. 18, 2019, the contents of all of which are incorporated herein by reference, in their entirety.

TECHNICAL FIELD

The present invention relates to a technical field of a parameter determination apparatus, a parameter determination method and a recording medium that are configured to determine a parameter of a neural network, and a signal transmission apparatus, a signal transmission method and a recording medium that are configured to transmit a signal, for example.

BACKGROUND ART

Recently, a utilization of a neural network is studied in various technical fields. For example, in a wireless communication system such as a mobile communication system, a distortion compensation circuit in a DPD (Digital Pre-Distortion) type is built by using a neural network (see a Non-Patent Literature 1).

In addition, there are a Patent Literature 1 to a Patent Literature 3 and a Non-Patent Literature 1 to a Non-Patent Literature 7 as a background art document relating to the present invention.

CITATION LIST

Patent Literature

Patent Literature 1: JP2009-064216A1
Patent Literature 2: JPH11(1999)-134003A1
Patent Literature 3: JPH08(1996)-249007A1

Non-Patent Literature

Non-Patent Literature 1: Zhijian Yu, "A Generalized "Digital Predistortion Model Based on Artificial Neural Networks", Proceedings of 2018 Asia-Pacific Microwave Conference, pp. 935-937, November 2018
Non-Patent Literature 2: J. Kim, K. Konstantinou, "Digital Predistortion of wide band signals based on power amplifier with memory", IET Electron Letter, Vol. 37 No. 23, pp. 11417-1418, November 2001
Non-Patent Literature 3: Dennis R. Morgan, Zhengxiang Ma, Jaehyeong Kim, Michael G. Zierdt, Hohn Pastalan, "A Generalized Memory Polynomial Model for Digital Predistortion of RF Power Amplifiers", IEEE Transaction on Signal Processing, Vol. 54 No 10, pp. 3852-3860, October 2006
Non-Patent Literature 4: Meenakshi Rawat, Fadhel M. Ghannouchi, "A Mutual Distortion and Impairment Compensator for Wideband Direct-Conversion Transmitters Using Neural Networks", IEEE Transaction on Broadcast, Vol. 58 No. 2, pp. 168-177, January 2012
Non-Patent Literature 5: Song Han, Jeff Pool, John Tran, William J. Dally, "Learning both Weights and Connections for Efficient Neural Networks", In Advances in Neural Information Processing Systems, 2015
Non-Patent Literature 6: Alieza Aghasi, Nam Nguyen, Justin Romberg, "Net-Trim: A Layer-wise Convex Pruning of Deeep Neural Networks", arXiv preprint arXiv: 1611.05162, 2016
Non-Patent Literature 7: Jessica Chani-Cahuana, Per Niklas Landin, Christian Fager, Thomas Eriksson, "Iterative Learning Control for RF Power Amplifier Linearization", IEEE Transaction on Microwave Theory and Techniques, Vol. 64 No. 9, pp. 2778-2789, September 2016

SUMMARY OF INVENTION

Technical Problem

An apparatus that is built by using the neural network has such a technical problem that a processing amount (namely, a calculation amount) is relatively large due to a complication of a network structure of the neural network. Thus, it is desired to build a neural network that requires a relatively small processing amount.

It is therefore an example object of the present invention to provide a parameter determination apparatus, a parameter determination method, a signal transmission apparatus, a signal transmission method and a recording medium that can solve the technical problems described above. As one example, the example object of the present invention is to provide a parameter determination apparatus, a parameter determination method and a recording medium that are configured to build a neural network that requires a relatively small processing amount, and a signal transmission apparatus, a signal transmission method and a recording medium that are configured to transmit a signal by using a neural network that requires a relatively small processing amount.

Solution to Problem

One example aspect of a parameter determination apparatus is a parameter determination apparatus that determines parameters of a neural network including a plurality of layers, the parameter determination apparatus includes: a first learning device that learns a weight between a [j−1]-th layer (note that j is an integer that satisfies such a condition that "2≤j≤the number of the layer") and a [j]-th layer to which an output of the [j−1]-th layer is inputted among the plurality of layers on the basis of a sample signal and a label signal; a selecting device that selects, as a part of the parameters, at least one valid path that is used as a valid connection path in the neural network for each node included in the [j]-th layer from a plurality of connection paths that connect a plurality of nodes included in the [j−1]-th layer and a plurality of nodes included in the [j]-th layer, respectively, on the basis of the weight learned by the first learning device; and a second learning device that learns, as a part of the parameters, at least one of the weight between the [j−1]-th layer and the [j]-th layer and a bias added in the [j]-th layer on the basis of the sample signal, the label signal and the valid path.

One example aspect of a signal transmission apparatus includes: a distortion compensating device that generates a distortion compensation signal by performing a distortion compensation on an input signal by using the neural network that is defined by parameters determined by a parameter determination apparatus; and a signal generating device that generates a transmission signal that is transmitted to a signal reception apparatus by performing a predetermined operation on the distortion compensation signal, the parameter determination apparatus includes: a first learning device that learns a weight between a [j−1]-th layer (note that j is an integer that satisfies such a condition that "2≤j≤the number of the layer") and a [j]-th layer to which an output of the [j−1]-th layer is inputted among the plurality of layers on the basis of a sample signal and a label signal; a selecting device that selects, as a part of the parameters, at least one valid path that is used as a valid connection path in the neural network for each node included in the [j]-th layer from a plurality of connection paths that connect a plurality of nodes included in the [j−1]-th layer and a plurality of nodes included in the [j]-th layer, respectively, on the basis of the weight learned by the first learning device; and a second learning device that learns, as a part of the parameters, at least one of the weight between the [j−1]-th layer and the [j]-th layer and a bias added in the [j]-th layer on the basis of the sample signal, the label signal and the valid path.

Another example aspect of a signal transmission apparatus includes: a distortion compensating device that generates a distortion compensation signal by performing a distortion compensation on an input signal by using a neural network; a signal generating device that generates a transmission signal that is transmitted to a signal reception apparatus by performing a predetermined operation on the distortion compensation signal; and a learning device that learns, as a part of parameters of the neural network, at least one of a weight between a [j−1]-th layer (note that j is an integer that satisfies such a condition that "2≤j≤the number of the layer") and a [j]-th layer to which an output of the [j−1]-th layer is inputted among a plurality of layers of the neural network and a bias added in the [j]-th layer on the basis of a sample signal and a label signal.

One example aspect of a parameter determination method is a parameter determination method that determines parameters of a neural network including a plurality of layers, the parameter determination method includes: learning a weight between a [j−1]-th layer (note that j is an integer that satisfies such a condition that "2≤j≤the number of the layer") and a [j]-th layer to which an output of the [j−1]-th layer is inputted among the plurality of layers on the basis of a sample signal and a label signal; selecting, as a part of the parameters, at least one valid path that is used as a valid connection path in the neural network for each node included in the [j]-th layer from a plurality of connection paths that connect a plurality of nodes included in the [j−1]-th layer and a plurality of nodes included in the [j]-th layer, respectively, on the basis of the weight learned by the first learning device; and learning, as a part of the parameters, at least one of the weight between the [j−1]-th layer and the [j]-th layer and a bias added in the [j]-th layer on the basis of the sample signal, the label signal and the valid path.

One example aspect of a signal transmission method includes: generating a distortion compensation signal by performing a distortion compensation on an input signal by using the neural network that is defined by parameters determined by a parameter determination apparatus; and generating a transmission signal that is transmitted to a signal reception apparatus by performing a predetermined operation on the distortion compensation signal, the parameter determination apparatus includes: a first learning device that learns a weight between a [j−1]-th layer (note that j is an integer that satisfies such a condition that "2≤j≤the number of the layer") and a [j]-th layer to which an output of the [j−1]-th layer is inputted among the plurality of layers on the basis of a sample signal and a label signal; a selecting device that selects, as a part of the parameters, at least one valid path that is used as a valid connection path in the neural network at least one for each node included in the [j]-th layer from a plurality of connection paths that connect a plurality of nodes included in the [j−1]-th layer and a plurality of nodes included in the [j]-th layer, respectively, on the basis of the weight learned by the first learning device; and a second learning device that learns, as a part of the parameters, at least one of the weight between the [j−1]-th layer and the [j]-th layer and a bias added in the [j]-th layer on the basis of the sample signal, the label signal and the valid path.

Another example aspect of a signal transmission method includes: generating a distortion compensation signal by performing a distortion compensation on an input signal by using a neural network; generating a transmission signal that is transmitted to a signal reception apparatus by performing a predetermined operation on the distortion compensation signal; and learning, as a part of parameters of the neural network, at least one of a weight between a [j−1]-th layer (note that j is an integer that satisfies such a condition that "2≤j≤the number of the layer") and a [j]-th layer to which an output of the [j−1]-th layer is inputted among a plurality of layers of the neural network and a bias added in the [j]-th layer on the basis of a sample signal and a label signal.

A first example aspect of a recording medium is a recording medium on which a computer program allowing a computer to execute a parameter determination method that determines parameters of a neural network including a plurality of layers is recorded, the parameter determination method includes: learning a weight between a [j−1]-th layer (note that j is an integer that satisfies such a condition that "2≤j≤the number of the layer") and a [j]-th layer to which an output of the [j−1]-th layer is inputted among the plurality of layers on the basis of a sample signal and a label signal; selecting, as a part of the parameters, at least one valid path that is used as a valid connection path in the neural network for each node included in the [j]-th layer from a plurality of connection paths that connect a plurality of nodes included in the [j−1]-th layer and a plurality of nodes included in the [j]-th layer, respectively, on the basis of the weight learned by the first learning device; and learning, as a part of the parameters, at least one of the weight between the [j−1]-th layer and the [j]-th layer and a bias added in the [j]-th layer on the basis of the sample signal, the label signal and the valid path.

A second example aspect of a recording medium is a recording medium on which a computer program allowing a computer to execute a signal transmission method is recorded, the signal transmission method includes: generating a distortion compensation signal by performing a distortion compensation on an input signal by using the neural network that is defined by parameters determined by a parameter determination apparatus; and generating a transmission signal that is transmitted to a signal reception apparatus by performing a predetermined operation on the distortion compensation signal, the parameter determination apparatus includes: a first learning device that learns a weight between a [j−1]-th layer (note that j is an integer that satisfies such a condition that "2≤j≤the number of the layer") and a [j]-th layer to which an output of the [j−1]-th layer is inputted among the plurality of layers on the basis of a sample signal and a label signal; a selecting device that selects, as a part of the parameters, at least one valid path that is used as a valid connection path in the neural network for each node included in the [j]-th layer from a plurality of connection paths that connect a plurality of nodes included in the [j−1]-th layer and a plurality of nodes included in the

[j]-th layer, respectively, on the basis of the weight learned by the first learning device; and a second learning device that learns, as a part of the parameters, at least one of the weight between the [j−1]-th layer and the [j]-th layer and a bias added in the [j]-th layer on the basis of the sample signal, the label signal and the valid path.

A third example aspect of a recording medium is a recording medium on which a computer program allowing a computer to execute a signal transmission method is recorded, the signal transmission method includes: generating a distortion compensation signal by performing a distortion compensation on an input signal by using a neural network; generating a transmission signal that is transmitted to a signal reception apparatus by performing a predetermined operation on the distortion compensation signal; and learning, as a part of parameters of the neural network, at least one of a weight between a [j−1]-th layer (note that j is an integer that satisfies such a condition that "2≤j≤the number of the layer") and a [j]-th layer to which an output of the [j−1]-th layer is inputted among a plurality of layers of the neural network and a bias added in the [j]-th layer on the basis of a sample signal and a label signal.

Advantageous Effects of Invention

According to the example aspect of each of the parameter determination apparatus, the parameter determination method and the recording medium described above, a neural network that requires a relatively small processing amount is built properly. Moreover, according to the example aspect of each of the signal transmission apparatus, the signal transmission method and the recording medium, a signal is transmitted using a neural network that requires a relatively small processing amount.

DESCRIPTION OF EXAMPLE EMBODIMENTS

Next, with reference to the drawings, an example embodiment of a parameter determination apparatus, a parameter determination method, a signal transmission apparatus, a signal transmission method and a recording medium will be described.

<1> Signal Transmission Apparatus 1

Figure 1:
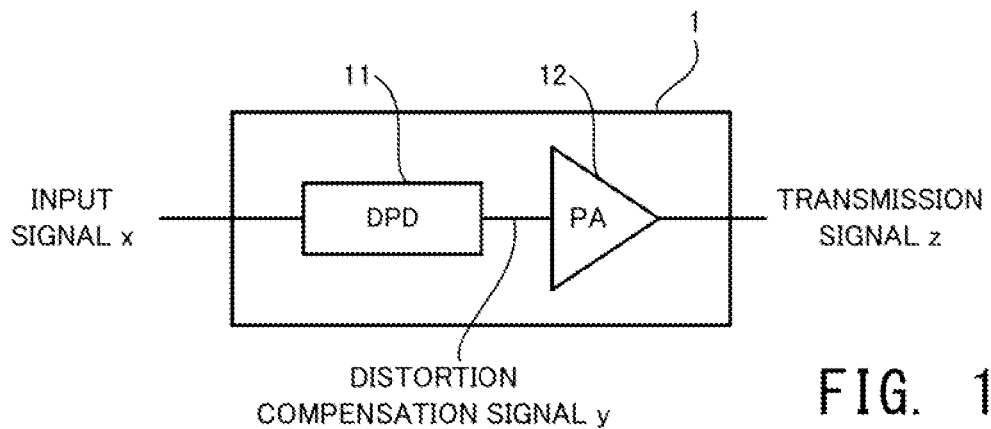
FIG. 1 is a block diagram that illustrates a configuration of a signal transmission apparatus in a present example embodiment.

Firstly, with reference to FIG. 1, a signal transmission apparat 1 in the example embodiment will be described. FIG. 1 is a block diagram that illustrates a configuration of the signal transmission apparat 1 in the example embodiment.

As illustrated in FIG. 1, the signal transmission apparatus 1 transmits a transmission signal z to a non-illustrated signal reception apparatus through a communication line. The communication line is typically a wireless communication line, however, at least a part thereof may be a wired communication line. In order to transmit the transmission signal z, the signal transmission apparatus 1 includes a distortion compensation circuit (DPD Digital Pre-Distortion) 11 and a power amplifier (PA) 12.

The distortion compensation circuit 11 performs a distortion compensation on an input signal x to generate a distortion compensation signal y. The distortion compensation circuit 11 performs, on the input signal x, the distortion compensation for compensating (typically, reducing or canceling) a distortion that is generated in the transmission signal z due to an operation of the power amplifier 12 to generate the distortion compensation signal y. In the example embodiment, the distortion compensation circuit 11 may be a distortion compensation apparatus in a DPD type, for example. Especially, the distortion compensation circuit 11 may generate the distortion compensation signal y obtained by reflecting an inverse distortion characteristic of the power amplifier 12 on the input signal x. In this case, it is possible to achieve both of a reduction of an electrical power consumption and a reduction of a distortion of the signal transmission apparatus 1. Specifically, it is possible to achieve both of an improvement of an efficiency of the signal transmission apparatus 1 and a securement of a linearity of an amplification characteristic of the signal transmission apparatus 1.

The power amplifier 12 performs a predetermined operation on the distortion compensation signal y outputted from the distortion compensation circuit 11. Specifically, the power amplifier 12 amplifies the distortion compensation signal y. The distortion compensation signal y amplified by the power amplifier 12 is transmitted, as the transmission signal z, to the signal reception apparatus through the communication line. Here, when the distortion compensation circuit 11 is the distortion compensation apparatus in the DPD type as described above, the power amplifier 12 outputs the transmission signal z that is linear with respect to the input signal x, because the distortion of the signal in the power amplifier 12 is cancelled by the inverse distortion of the signal in the distortion compensation circuit 11.

Figure 2:
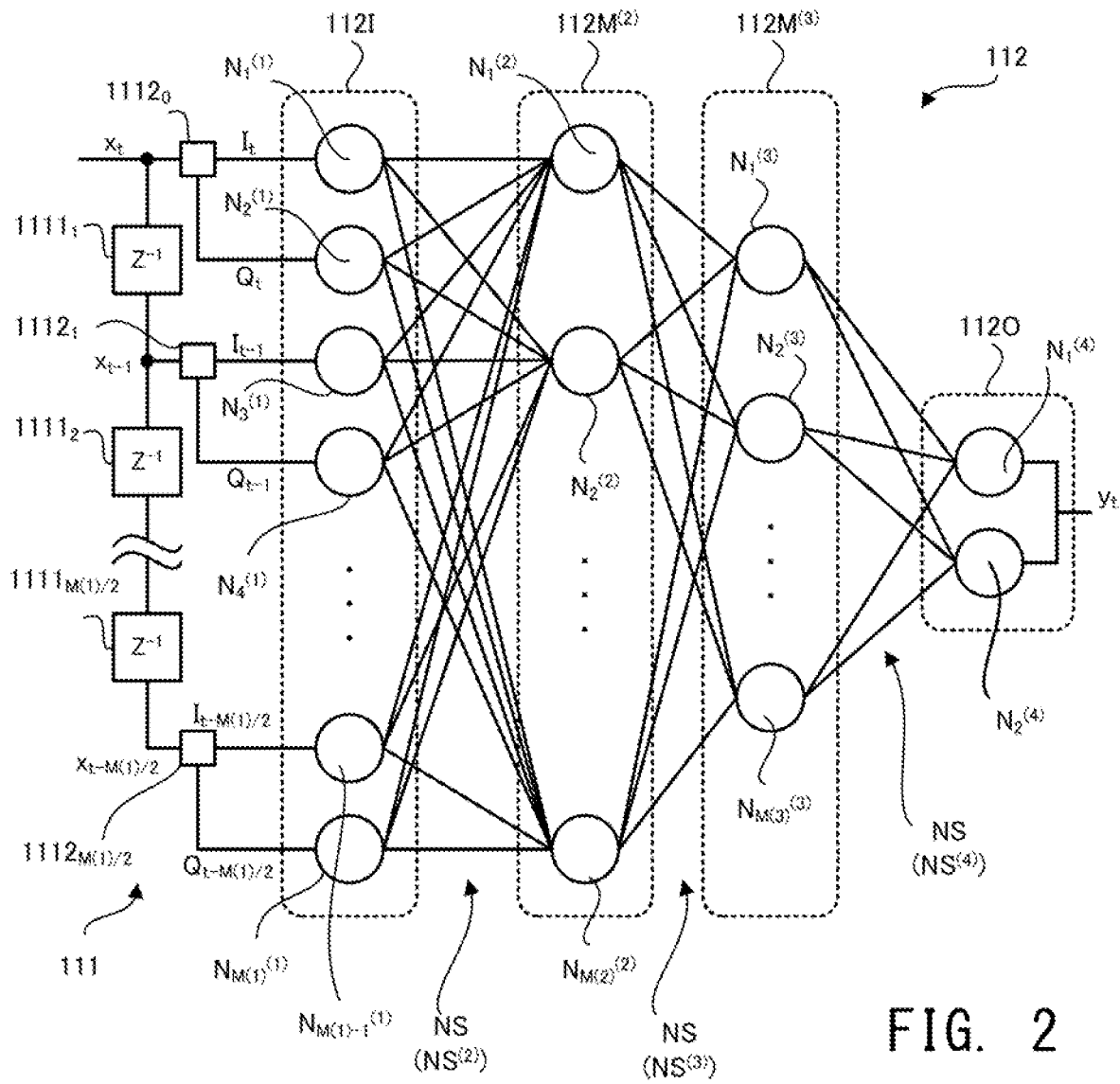
FIG. 2 is a block diagram that illustrates a configuration of a distortion compensation circuit.

Especially in the example embodiment, the distortion compensation circuit 11 performs the distortion compensation on the input signal x by using a neural network 112 (see FIG. 2). Next, a configuration of the distortion compensation circuit 11 will be further described in detail with reference to FIG. 2. FIG. 2 is a block diagram that illustrates the configuration of the distortion compensation circuit 11.

As illustrated in FIG. 2, the distortion compensation circuit 11 includes a signal generating unit 111 and the neural network 112.

The signal generating unit 111 generates, from an input signal $x_t$ inputted to the distortion compensation circuit 11, a plurality of signals (typically, a plurality of signals to which different delays are added, respectively) that are inputted to the neural network 112. Note that the input signal $x_t$ means a complex signal of the input signal x that is inputted to the distortion compensation circuit 11 at a time t.

The signal generating unit 111 may generate the plurality of signals by using any method, as long as the signal generating unit 111 generates, from the input signal $x_t$, the plurality of signals that are inputted to the neural network 112. In an example illustrated in FIG. 2, the signal generating unit 111 generates an input signal $x_{t-1}$ to an input signal $x_{t-M(1)/2}$, on the basis of the input signal $x_t$. Note that a variable number M(1) represents the total number of a node (namely, a neuron) $N^{(1)}$ that is included in a below described input layer 112I of the neural network 112. A symbol "/" means a division (the same is applied to the below described description). In order to generate the input signal $x_{t-1}$ to the input signal $x_{t-M(1)/2}$, on the basis of the input signal $x_t$, the signal generating unit 111 includes delay circuits 1111 the number of which is M(1)/2 (specifically, a delay circuit $1111_1$ to a delay circuit $1111_{M(1)/2}$. The delay circuit $1111h$ (note that a variable number h is an integer that from t to t-M(1)/2) adds a delay to the input signal $x_{t-h+1}$ to generate the input signal $x_{t-h}$. Moreover, the signal generating unit 111 generates, from the input signal $x_{t-h}$, an input signal $I_{t-hg}$ that corresponds to an I axis signal component of the input signal $x_{t-t}$ and an input signal $Q_{t-h}$ that corresponds to a Q axis signal component of the input signal $x_{t-h}$. The I axis signal component of the input signal $x_{t-h}$ corresponds to an in-phase signal component of a waveform of the input signal $x_{t-h}$. The Q axis signal component of the input signal $x_{t-h}$ corresponds to a quadrature component of the waveform of the input signal $x_{t-h}$. In order to generate the input signals $I_{t-h}$ and $Q_{t-h}$ from the input signal $x_{t-h}$, the signal generating unit 111 includes signal converters 1112 the number of which is M(1)/2+1 (specifically, a signal converter $1112_0$ to a signal converter $1112_{M(1)/2}$. The signal converter $1112_h$ generate the input signals $I_{t-h}$ and $Q_{t-h}$ from the input signal $x_{t-h}$. As a result, the input signals $I_t$ to $I_{M(1)/2}$ and the input signals $Q_t$ to $Q_{M(1)/2}$ are inputted to the neural network 112.

Note that the signal generating unit 111 may generate the input signal $x_{t-1}$ to the input signal $x_{t-M(1)}$ on the basis of the input signal $x_{t-h}$ and input amplitude values of the generated input signal $x_t$ to the input signal $x_{t-M(1)}$ to the neural network 112. Moreover, the signal generating unit 111 may mix the amplitude values of the input signal $x_t$ to the input signal $x_{t-M(1)}$, the input signal $I_t$ to the input signal $I_{t-M(1)}$ and the input signal $Q_t$ to the input signal $Q_{t-M(1)}$ and input them to the neural network 112. The signal generating unit 111 may input a value (for example, an exponential value and the like) calculated by using the amplitude values of the input signal $x_t$ to the input signal $x_{t-M(1)}$, the input signal $I_t$ to the input signal $I_{t-M(1)}$ and the input signal $Q_t$ to the input signal $Q_{t-M(1)}$ to the neural network 112.

The neural network 112 generates a distortion signal $y_t$ (namely, the input signal $x_t$ on which the distortion compensation is already performed) on the basis of the input signal $I_t$ to the input signal $I_{t-M(1)/2}$ and the input signal $Q_t$ to the input signal $Q_{t-M(1)/2}$. The neural network 112 includes the input layer 112I, at least one hidden layer (namely, a middle layer) 112M and an output layer 112O. In the example illustrated in FIG. 2, the neural network 112 includes two hidden layers 112M (specifically, a first hidden layer $112M^{(2)}$ and a second hidden layer $112M^{(3)}$), however, may include one or three or more hidden layer 112.

The input layer 112I is a first layer of the neural network 112. The input layer 112I includes nodes $N^{(1)}$ the number of which is M(1). In the below described description, the M(1) nodes $N^{(1)}$ are referred to as a node $N_1^{(1)}$ to a node $N_{M(1)}^{(1)}$ to distinguish them. The variable number M(1) is typically an integer that is equal to or larger than 2. The first hidden layer $112M^{(2)}$ is a second layer of the neural network 112. The first hidden layer $112M^{(2)}$ includes nodes $N^{(2)}$ the number of which is M(2). In the below described description, the M(2) nodes $N^{(2)}$ are referred to as a node $N_1^{(2)}$ to a node $N_{M(2)}^{(2)}$ to distinguish them. The variable number M(2) is typically an integer that is equal to or larger than 2. The second hidden layer $112M^{(3)}$ is a third layer of the neural network 112. The second hidden layer $112M^{(3)}$ includes nodes $N^{(3)}$ the number of which is M(3). In the below described description, the M(3) nodes $N^{(3)}$ are referred to as a node $N_1^{(3)}$ to a node $N_{M(3)}^{(3)}$ to distinguish them. The variable number M(3) is typically an integer that is equal to or larger than 2. The output layer 112O is a fourth layer of the neural network 112. The output layer 112O includes nodes $N^{(42)}$ the number of which is M(4). In the below described description, the M(4) nodes $N^{(4)}$ are referred to as a node $N_1^{(4)}$ to a node $N_{M(4)}^{(4)}$ to distinguish them. The variable number M(4) is typically an integer that is equal to or larger than 2, however, may be 1. In the example illustrated in FIG. 2, the variable number M(4) is 2 and the output layer 112O includes the node $N_1^{(4)}$ and node $N_2^{(4)}$.

The input signal $I_t$ to the input signal $I_{t-M(1)/2}$ and the input signal $Q_t$ to the input signal $Q_{t-M(1)/2}$ are inputted to the node $N_1^{(1)}$ to the node $N_{M(1)}^{(1)}$ of the input layer 112I, respectively. In the example illustrated in FIG. 2, when k is an odd number, the input signal $I_{t-(k-1)/2}$ is inputted to the [k]-th node $N_k^{(1)}$ of the input layer 112I. When k is an even number, the input signal $Q_{t-(k-2)/2}$ is inputted to the [k]-th node $N_k^{(1)}$ of the input layer 112I. An output $H_k^{(1)}$ of the [k]-th node $N_k^{(1)}$ may be same as the input to the [k]-th node $N_k^{(1)}$. Note that the variable number k represents an integer that is equal to or larger than 0 and that is equal to or smaller than M(1). Alternatively, the output $H_k^{(1)}$ of the [k]-th node $N_k^{(1)}$ may be represented by an equation 1. "real (x)" in the equation 1 is a function that outputs a real number component of the complex input signal x, and "imag (x)" in the equation 1 is a function that outputs an imaginary number component of the complex input signal x. The output $H_k^{(1)}$ of the [k]-th node $N_k^{(1)}$ of the input layer 112I is inputted to each of the node $N_1^{(2)}$ to node $N_{M(2)}^{(2)}$ through M(2) connection paths that connect the [k]-th node $N_k^{(1)}$ of the input layer 112I and the node $N_1^{(2)}$ to node $N_{M(2)}^{(2)}$ of the first hidden layer $112M^{(2)}$, respectively. Note that the variable number k in the equation 1 represents an integer that is equal to or larger than 1 and that is equal to or smaller than M(1)/2, exceptionally.

$$H_k^{(1)} = \text{real}(x_{t-k+1}),$$ [equation 1]
$$H_{k+\frac{M(1)}{2}}^{(1)} = \text{imag}(x_{t-k+1})$$

An output $H_m^{(2)}$ of the [m]-th node $N_m^{(2)}$ of the first hidden layer $112M^{(2)}$ is represented by an equation 2. "$w_{k,m}^{(2)}$" in the equation 2 represents a weight in a connection path between the [k]-th node $N_k^{(1)}$ of the input layer 112I and the [m]-th node $N_m^{(2)}$ of the first hidden layer $112M^{(2)}$. "$b_m^{(2)}$" in the equation 2 represents a bias that is used (namely, added) in the [m]-th node $N_m^{(2)}$ of the first hidden layer $112M^{(2)}$. "f" in the equation 2 represents an activation function. A sigmoid function or a ReLu (Rectified Linear Unit) function may be used as the activation function, for example. The output $H_m^{(2)}$ of the [m]-th node $N_m^{(2)}$ of the first hidden layer $112M^{(2)}$ is inputted to each of the node $N_1^{(3)}$ to node $N_{M(3)}^{(3)}$ through M(3) connection paths that connect the [m]-th node $N_m^{(2)}$ of the first hidden layer $112M^{(2)}$ and the node $N_1^{(3)}$ to node $N_{M(3)}^{(3)}$ of the second hidden layer $112M^{(3)}$, respectively. Note that the variable number m represents an integer that is equal to or larger than 1 and that is equal to or smaller than M(2), exceptionally.

$$H_m^{(2)} = f\left(\left(\sum_{k=1}^{M(1)} H_k^{(1)} \times w_{k,m}^{(2)}\right) + b_m^{(2)}\right)$$ [equation 2]

An output $H_n^{(3)}$ of the [n]-th node $N_n^{(3)}$ of the second hidden layer $112M^{(3)}$ is also represented by the equation 2. However, when the output $H_n^{(3)}$ is represented by the equation 2, "$H_k^{(1)}$" and "$H_m^{(2)}$" are replaced by "$H_m^{(2)}$" and "$H_n^{(3)}$", respectively, "$w_{k,m}^{(2)}$" in the equation 2 is replaced by a weight $w_{m,n}^{(3)}$ in a connection path between the [m]-th node $N_m^{(2)}$ of the first hidden layer $112M^{(2)}$ and the [n]-th node $N_n^{(3)}$ of the second hidden layer $112M^{(3)}$, and "$b_m^{(2)}$" in the equation 2 is replaced by a bias $b_n^{(3)}$ that is used (namely, added) in the [n]-th node $N_n^{(3)}$ of the second hidden layer $112M^{(3)}$. The output $H_n^{(3)}$ of the [n]-th node $N_n^{(3)}$ of the second hidden layer $112M^{(3)}$ is inputted to each of the node $N_1^{(4)}$ to node $N_{M(4)}^{(4)}$ through M(4) connection paths that connect the [n]-th node $N_n^{(3)}$ of the second hidden layer $112M^{(3)}$ and the node $N_1^{(4)}$ to node $N_{M(4)}^{(4)}$ of the output layer 112O, respectively. Note that the variable number n represents an integer that is equal to or larger than 1 and that is equal to or smaller than M(3), exceptionally.

An output $H_o^{(4)}$ of the [o]-th node $N_o^{(4)}$ of the output layer 112O is also represented by the equation 2. However, when the output $H_o^{(4)}$ is represented by the equation 2, "$H_k^{(1)}$" and "$H_m^{(2)}$" are replaced by "$H_n^{(3)}$" and "$H_o^{(4)}$", respectively, "$w_{k,m}^{(2)}$" in the equation 2 is replaced by a weight $w_{n,o}^{(4)}$ in a connection path between the [n]-th node $N_n^{(3)}$ of the second hidden layer $112M^{(3)}$ and the [o]-th node $N_o^{(4)}$ of the output layer 112O, and "$b_m^{(2)}$" in the equation 2 is replaced by a bias $b_o^{(4)}$ that is used (namely, added) in the [o]-th node $N_o^{(4)}$ of the output layer 112O. Note that the variable number O represents an integer that is equal to or larger than 1 and that is equal to or smaller than M(4), exceptionally.

The output of the output layer 112O corresponds to a final output signal $y_t$. The output signal $y_t$ corresponds to the distortion compensation signal y generated from the input signal $x_t$ at the time t. Note that the output layer 112O may not include the activation function f. In this case, the output of the output layer 112O may be a linear sum obtained by using the outputs of the nodes $N_1^{(3)}$ to $N_{M(3)}^{(3)}$ of the second hidden layer $112M^{(3)}$ as the basis.

A characteristic (substantially, a structure) of the neural network 112 is determined by parameters including the above described weight w, the above described bias b and a connecting aspect CA of nodes N, for example.

The weight w includes a weight $w^{(2)}$ between the input layer 112I and the first hidden layer $112M^{(2)}$. The weight $w^{(2)}$ includes M(1)×M(2) weights $w_{k,m}^{(2)}$ (1≤k≤M(1), 1≤m≤M(2)) that correspond to M(1)×M(2) connection paths between the input layer 112I and the first hidden layer $112M^{(2)}$. Namely, the weight $w^{(2)}$ is a vector determined by the M(1)×M(2) weights $w_{k,m}^{(2)}$. The weight w further includes a weight $w^{(3)}$ between the first hidden layer $112M^{(2)}$ and the second hidden layer $112M^{(3)}$. The weight $w^{(3)}$ includes M(2)×M(3) weights $w_{m,n}^{(3)}$ (1≤m≤M(2), 1≤n≤M(3)) that correspond to M(2)×M(3) connection paths between the first hidden layer $112M^{(2)}$ and the second hidden layer $112M^{(3)}$. Namely, the weight $w^{(3)}$ is a vector determined by the M(2)×M(3) weights $w_{m,n}^{(3)}$. The weight w further includes a weight $w^{(4)}$ between the second hidden layer $112M^{(3)}$ and the output layer 112O. The weight $w^{(4)}$ includes M(3)×M(4) weights $w_{n,o}^{(4)}$ (1≤n≤M(3), 1≤o≤M(4)) that correspond to M(3)×M(4) connection paths between the second hidden layer $112M^{(3)}$ and the output layer 112O. Namely, the weight $w^{(4)}$ is a vector determined by the M(3)×M(4) weights $w_{n,o}^{(4)}$.

The connecting aspect CA includes a connecting aspect $CA^{(2)}$ between the node $N_1^{(1)}$ to the node $N_{M(1)}^{(1)}$ included in the input layer 112I and the node $N_1^{(2)}$ to $N_{M(2)}^{(2)}$ included in the first hidden layer $112M^{(2)}$. The connecting aspect CA further includes a connecting aspect $CA^{(3)}$ between the node $N_1^{(2)}$ to the node $N_{M(2)}^{(2)}$ included in the first hidden layer $112M^{(2)}$ and the node $N_1^{(3)}$ to $N_{M(3)}^{(3)}$ included in the second hidden layer $112M^{(3)}$. The connecting aspect CA further includes a connecting aspect $CA^{(4)}$ between the node $N_1^{(3)}$ to the node $N_{M(3)}^{(3)}$ included in the second hidden layer $112M^{(3)}$ and the node $N_1^{(4)}$ to $N_{M(4)}^{(4)}$ included in the output layer 112O.

Note that the connecting aspect between the node N in one layer and the node N in another layer here is information that indicates a presence or an absence of the connection between the node N in one layer and the node N in another layer. Namely, the connecting aspect between the node N in one layer and the node N in another layer here is information that indicates whether or not there is the connection path through which an output of the node N in one layer is inputted to the node N in another layer.

The bias b includes a bias $b^{(2)}$ that is added in the first hidden layer $112M^{(2)}$, a bias $b^{(3)}$ that is added in the second hidden layer $112M^{(3)}$ and a bias $b^{(4)}$ that is added in the output layer 112O. The bias $^{(2)}$ includes M(2) biases $b_m^{(2)}$ (1≤m≤M(2)) that are added in the node $N_1^{(2)}$ to the node $N_{M(2)}^{(2)}$ included in the first hidden layer $112M^{(2)}$, respectively. Namely, the bias $b^{(2)}$ is a vector determined by the M(2) biases $b_m^{(2)}$. The bias $b^{(3)}$ includes M(3) biases $b_n^{(3)}$ (1≤n≤M(3)) that are added in the node $N_1^{(3)}$ to the node $N_{M(3)}^{(3)}$ included in the second hidden layer $112M^{(3)}$, respectively. Namely, the bias $b^{(3)}$ is a vector determined by the M(3) biases $b_n^{(3)}$. The bias $b^{(4)}$ includes M(4) biases $b_o^{(4)}$ (1≤o≤M(4)) that are added in the node $N_1^{(4)}$ to the node $N_{M(4)}^{(4)}$ included in the output layer 112O, respectively. Namely, the bias $b^{(4)}$ is a vector determined by the M(4) biases $b_o^{(4)}$.

These parameters are determined by a below described parameter determination apparatus 2. In this case, it can be said the parameter determination apparatus 2 corresponds to an apparatus that performs a learning process and an estimation process is performed by the signal transmission apparatus 1 (especially, the distortion compensation circuit 11) by using the parameters obtained by the learning process. Next, the parameter determination apparatus 2 will be described.

<2> Parameter Determination Apparatus 2

<2-1> Configuration of Parameter Determination Apparatus 2

Figure 3:
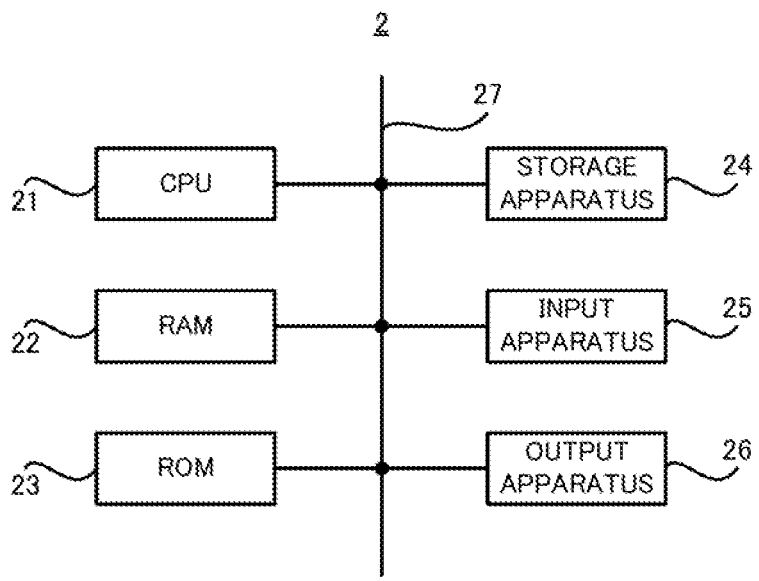
FIG. 3 a block diagram that illustrates a hardware configuration of a parameter determination apparatus in the present example embodiment.

Firstly, with reference to FIG. 3, a hardware configuration of the parameter determination apparat 2 in the example embodiment will be described. FIG. 3 is a block diagram that illustrates the hardware configuration of the parameter determination apparat 2 in the first example embodiment.

As illustrated in FIG. 3, the parameter determination apparatus 2 includes a CPU (Central Processing Unit) 21, a RAM (Random Access Memory) 22, a ROM (Read Only Memory) 23 and a storage apparatus 24. Furthermore, the parameter determination apparatus 2 may include an input apparatus 25 and an output apparatus 26. The CPU 21, the RAM 22, the ROM 23, the storage apparatus 24, the input apparatus 25, and the output apparatus 26 are connected through a data bus 27.

The CPU 21 reads a computer program. For example, the CPU 21 may read a computer program stored by at least one of the RAM 22, the ROM 23 and the storage apparatus 24. For example, the CPU 21 may read a computer program stored in a computer-readable recording medium, by using a non-illustrated recording medium reading apparatus. The CPU 21 may obtain (namely, read) a computer program from a non-illustrated apparatus disposed outside the parameter determination apparatus 2, through a communication network interface. The CPU 21 controls the RAM 22, the storage apparatus 24, the input apparatus 25 and the output apparatus 26 by executing the read computer program. Especially in the present example embodiment, when the CPU 21 executes the read computer program, a logical functional block(s) for determining the parameters of the neural network 112 is implemented in the CPU 21. In other words, the CPU 21 is configured to function as a controller for implementing a logical functional block for determining the parameters of the neural network 112. Note that a configuration of the logical block implemented in the CPU 21 will be described later.

The RAM 22 temporarily stores the computer program to be executed by the CPU 21. The RAM 22 temporarily stores the data that are temporarily used by the CPU 21 when the CPU 21 executes the computer program. The RAM 22 may be, for example, a D-RAM (Dynamic RAM).

The ROM 23 stores a computer program to be executed by the CPU 21. The ROM 23 may otherwise store fixed data. The ROM 23 may be, for example, a P-ROM (Programmable ROM).

The storage apparatus 24 stores the data that are stored for a long term by the parameter determination apparatus 2. The storage apparatus 24 may operate as a temporary storage apparatus of the CPU 21. The storage apparatus 24 may include, for example, at least one of a hard disk apparatus, a magneto-optical disk apparatus, an SSD (Solid State Drive), and a disk array apparatus.

The input apparatus 25 is an apparatus that receives an input instruction from a user of the parameter determination apparatus 2. The input apparatus 25 may include, for example, at least one of a keyboard, a mouse, and a touch panel.

The output apparatus 26 is an apparatus that outputs information about the parameter determination apparatus 2, to the outside. For example, the output apparatus 26 may be a display apparatus that is configured to display the information about the learning apparatus 1.

<2-2> Functional Block in CPU 21

Figure 4:
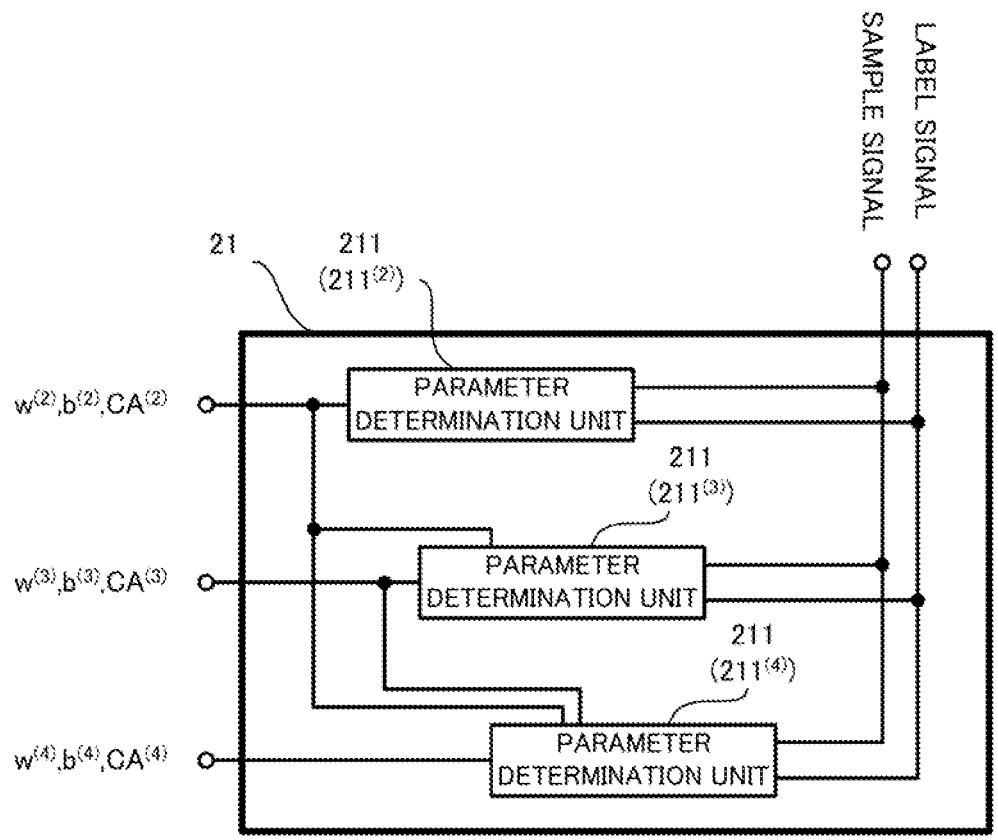
FIG. 4 is a block diagram that illustrates a functional block implemented in a CPU of the parameter determination apparatus in the present example embodiment.

Next, with reference to FIG. 4, the functional block that is implemented in the CPU 21 will be described. FIG. 4 is a block diagram that illustrates the functional block implemented in the CPU 21.

As illustrated in FIG. 4, at least one parameter determination unit 211 is implemented in the CPU 21 as the logical function block for determining the parameters of the neural network 112. The number of the parameter determination unit 211 is smaller than the number of the layers included in the neural network 112 by one. In other words, the number of the parameter determination unit 211 is equal to the number of the hidden layers 112M and the output layer 112O included in the neural network 112. In an example, three parameter determination units 211 (specifically, a parameter determination unit $211^{(2)}$, a parameter determination unit $211^{(3)}$ and a parameter determination unit $211^{(4)}$) are implemented in the CPU 21. This is because the neural network 112 includes four layers (specifically, one input layer 112I, two hidden layer 112M and one output layer 112O) as illustrated in FIG. 2.

Note that FIG. 3 merely conceptually (in other words, simply) illustrates the logical function block for determining the parameters of the neural network 112. Namely, the logical function block illustrated in FIG. 3 is not necessarily implemented in the CPU 21 as it is, and a configuration of the logical function block implemented in the CPU 21 is not limited to a configuration illustrated in FIG. 3, as long as the CPU 21 is configured to perform the operation that is performed by the logical function block illustrated in FIG. 3.

The parameter determination unit $211^{(2)}$ determines parameters defining a network structure NS between the input layer 112I and the first hidden layer $112M^{(1)}$ (hereinafter, it is referred to as a network structure $NS^{(2)}$, see FIG. 2). The parameters defining the network structure $NS^{(2)}$ includes the weights $w^{(2)}$ (namely, the M(1)×M(2) weights $w_{k,m}^{(2)}$) between the input layer 112I and the first hidden layer $112M^{(2)}$, the connecting aspect $CA^{(2)}$ between the node $N_1^{(1)}$ to the node $N_{M(1)}^{(1)}$ included in the input layer 112I and the node $N_1^{(2)}$ to $N_{M(2)}^{(2)}$ included in the first hidden layer $112M^{(2)}$ and the bias $b^{(2)}$ (namely, the M(2) biases $b_m^{(2)}$) that is added in the first hidden layer $112M^{(2)}$.

The parameter determination unit $211^{(3)}$ determines parameters defining a network structure NS between the first hidden layer $112M^{(2)}$ and the second hidden layer $112M^{(3)}$ (hereinafter, it is referred to as a network structure $NS^{(3)}$, see FIG. 2). The parameters defining the network structure $NS^{(3)}$ includes the weights $w^{(3)}$ (namely, the M(2)×M(3) weights $w_{m,n}^{(3)}$) between the first hidden layer $112M^{(2)}$ and the second hidden layer $112M^{(3)}$, the connecting aspect $CA^{(3)}$ between the node $N_1^{(2)}$ to the node $N_{M(2)}^{(2)}$ included in the first hidden layer $112M^{(2)}$ and the node $N_1^{(3)}$ to $N_{M(3)}^{(3)}$ included in the second hidden layer $112M^{(3)}$ and the bias $b^{(3)}$ (namely, the M(3) biases $b_n^{(3)}$) that is added in the second hidden layer $112M^{(3)}$.

The parameter determination unit $211^{(4)}$ determines parameters defining a network structure NS between the second hidden layer $112M^{(3)}$ and the output layer 112O (hereinafter, it is referred to as a network structure $NS^{(4)}$, see FIG. 2). The parameters defining the network structure $NS^{(4)}$ includes the weights $w^{(4)}$ (namely, the $M(3) \times M(4)$ weights $w_{n,m}^{(4)}$) between the second hidden layer $112M^{(3)}$ and the output layer $112O$ ($1 \leq n \leq M(3)$, $1 \leq o \leq M(4)$), the connecting aspect $CA^{(4)}$ between the node $N_1^{(3)}$ to the node $N_{M(3)}^{(3)}$ included in the second hidden layer $112M^{(3)}$ and the node $N_1^{(4)}$ to $N_{M(4)}^{(4)}$ included in the output layer $112O$ and the bias $b^{(4)}$ (namely, the $M(4)$ biases $b_o^{(4)}$) that is added in the output layer $112O$.

Each parameter determination unit 211 determines the parameter relating to the network structure NS corresponding to each parameter determination unit 211 (namely, the network structure NS between two layers corresponding to each parameter determination unit 211) on the basis of a sample signal (namely, sample data) and a label signal (namely, label data). Each of the sample signal and the label signal may be a signal based on at least one of the input signal x, the distortion compensation signal y and the transmission signal z, for example. Each of the sample signal and the label signal may be a signal that is generated by using at least one of the input signal x, the distortion compensation signal y and the transmission signal z, for example. A method of generating the sample signal and the label signal may be selected on the basis of an algorithm for the distortion compensation in the distortion compensation circuit 11. For example, when an indirect learning method is used, a signal corresponding to the transmission signal z may be used as the sample data and a signal corresponding to the distortion compensation signal y or the input signal x may be used as the label signal. Namely, the distortion compensation signal y that should be outputted from the distortion compensation circuit 11 or the input signal x that should be inputted to the distortion compensation circuit 11 when a certain sample signal is outputted from the power amplifier 12 as the transmission signal z may be used as the label signal. Alternatively, for example, when a direct learning method is used, a signal corresponding to the input signal x may be used as the sample data and a signal corresponding to the distortion compensation signal y may be used as the label signal. Namely, the distortion compensation signal y that should be outputted from the distortion compensation circuit 11 (namely, the distortion compensation signal y that is obtained by performing an ILC (Iterative Learning Control)) when a certain sample signal is inputted to the distortion compensation circuit 11 may be used as the label signal.

Each parameter determination unit 211 determines the parameters of the network structure NS corresponding to each parameter determination unit 211 on the basis of not only the sample signal and the label signal but also the parameters relating to the network structure NS that is at an upstream side of the network structure NS corresponding to each parameter determination unit 211. Namely, each parameter determination unit 211 determines the parameters of the network structure NS corresponding to each parameter determination unit 211 on the basis of not only the sample signal and the label signal but also the parameters relating to the network structure NS between an upstream layer of two layers corresponding to each parameter determination unit 211 and the input layer 112I. Specifically, since the input layer 112I is a first layer, there is not other network structure MS included in the neural network 112 at an upstream side of the network structure $NS^{(2)}$ between the input layer 112I and the first hidden layer $112M^{(2)}$. Thus, the parameter determination unit $211^{(2)}$ may not necessarily consider the parameter of other network structure NS when the parameters relating to the network structure $NS^{(2)}$ is determined. Moreover, there is the network structure $NS^{(2)}$ at an upstream side of the network structure $NS^{(3)}$ between the first hidden layer $112M^{(2)}$ and the second hidden layer $112M^{(3)}$. Thus, the parameter determination unit $211^{(3)}$ considers the parameter relating to the network structure $NS^{(2)}$ when the parameters relating to the network structure $NS^{(3)}$ is determined. Therefore, an information relating to the parameter determined by the parameter determination unit $211^{(2)}$ is outputted to the parameter determination unit $211^{(3)}$. Moreover, there are the network structure $NS^{(2)}$ and the network structure NS(3) at an upstream side of the network structure NS(4) between the second hidden layer $112M^{(3)}$ and the output layer 112O. Thus, the parameter determination unit $211^{(4)}$ considers the parameter relating to the network structure $NS^{(2)}$ and the parameter relating to the network structure $NS^{(3)}$ when the parameters relating to the network structure $NS^{(4)}$ is determined. Therefore, the information relating to the parameter determined by the parameter determination unit $211^{(2)}$ and an information relating to the parameter determined by the parameter determination unit $211^{(3)}$ are outputted to the parameter determination unit $211^{(4)}$.

<2-3> Configuration of Parameter Determination Unit 211

Figure 5:
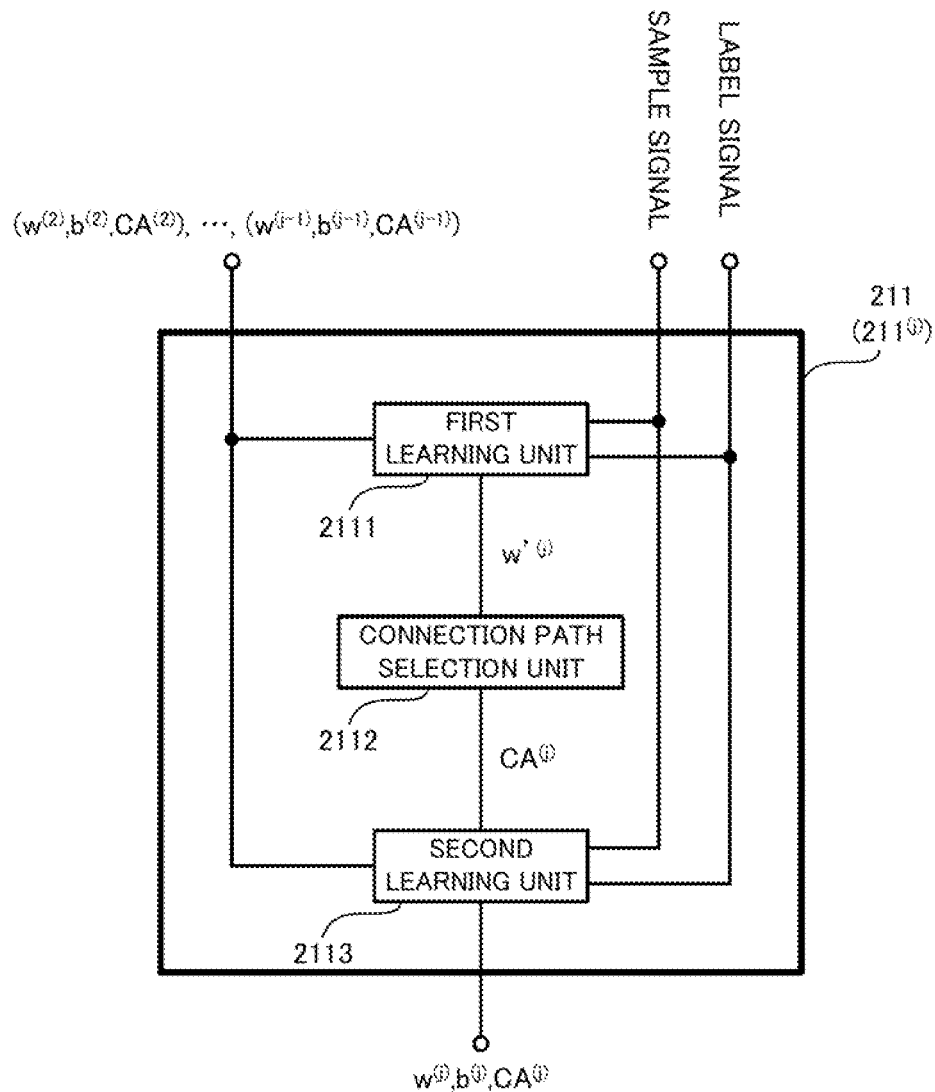
FIG. 5 a block diagram that illustrates a configuration of a parameter determination unit.

Next, with reference to FIG. 5, a configuration of the parameter determination unit 211 (namely, a functional block implemented in the parameter determination unit 211) will be described. FIG. 5 is a block diagram that illustrates the configuration of the parameter determination unit 211.

As illustrated in FIG. 5, the parameter determination unit $211^{(j)}$ (note that j is an integer that is equal to or larger than 2 and that is equal to or smaller than the number of the layers included in the neural network 112, and 2, 3 or 4 in an example illustrated in FIG. 5) includes a first learning unit 2111, a connection path selection unit 2112 and a second learning unit 2113. The operation of each of the first learning unit 2111, the connection path selection unit 2112 and the second learning unit 2113 will be described later in detail.

<2-4> Operation of Parameter Determination Unit 211

Figure 6:
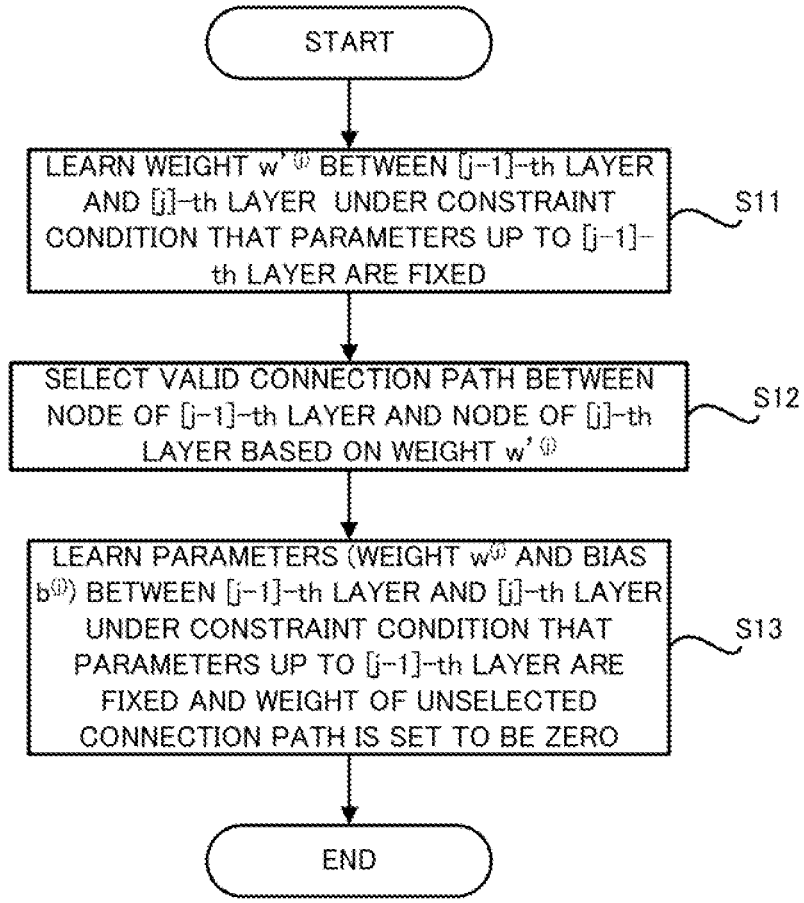
FIG. 6 is a flow chart that illustrates a flow of an operation of the parameter determination unit.

Next, with reference to FIG. 6, an operation of the parameter determination unit 211 will be described. FIG. 6 is a flowchart that illustrates a flow of the operation of the parameter determination unit 211. In the below described description, the flow of the operation of the parameter determination unit $211^{(j)}$ will be described. Namely, in the below described description, the flow of the operation for determining the parameters relating to the network structure $NS^{(j)}$ between the [j−1]-th layer and the [j]-th layer by the parameter determination unit $211^{(j)}$ will be described.

As illustrated in FIG. 6, firstly, the first learning unit 2111 learns (namely, updates or determines) the weight $w^{(j)}$ in the network structure $NS^{(j)}$ corresponding to the parameter determination unit $211^{(j)}$ (a step S11). Note that the first learning unit 2111 may learn the bias$^{(j)}$ in the network structure $NS^{(j)}$ corresponding to the parameter determination unit $211^{(j)}$ in addition to the weight $w^{(j)}$. In this case, initial values of the weight $w^{(j)}$ and the bias $b^{(j)}$ may be set by using a random number.

Note that the weight $w^{(j)}$ learned by the first learning unit 2111 is a parameter that is used by the connection path selection unit 2212 and is not actually used as the $w^{(j)}$ of the neural network 112 as described below in detail. Thus, the weight wo) learned by the first learning unit 2111 is referred to as "$w'^{(j)}$" to distinguish it from the actual weight $w^{(j)}$ of the neural network 112 (namely, the weight $w^{(j)}$ learned by the second learning unit 2113) for convenience of description.

Specifically, when j=2, the first learning unit 2111 learns the weight $w'^{(2)}$ on the basis of the sample signal and the label signal. Thus, the sample signal and the label signal are inputted to the first learning unit 2111 of the parameter determination unit $221^{(2)}$. When j≥3, the first learning unit 2111 learns the weight $w'^{(j)}$ on the basis of the sample signal, the label signal and the parameters of each of the network structure $NS^{(2)}$ to the network structure $NS^{(j-1)}$ that are located at the upstream side of the network structure $NS^{(j)}$ corresponding to the parameter determination unit $211^{(j)}$. Namely, the first learning unit 2111 learns the weight $w'^{(j)}$ on the basis of the sample signal, the label signal, the weight $w^{(2)}$ to the weight $w^{(j-1)}$, the bias $b^{(2)}$ to the bias $b^{(j-1)}$ and the connecting aspect $CA^{(2)}$ to the connecting aspect $CA^{(j-1)}$. Thus, the sample signal, the label signal and the parameters of each of the network structure $NS^{(2)}$ to the network structure $NS^{(j-1)}$ are inputted to the first learning unit 2111 of the parameter determination unit $211^{(j)}$.

The first learning unit 2111 inputs the sample signal to a neural network for the learning having a structure that is same as that of the neural network 112. Then, the first learning unit 2111 changes the weight $w'^{(j)}$ of the neural network for the learning so as to reduce (preferably, minimize) an error (namely, a learning error) between a signal outputted by the neural network for the learning and the label signal. A squared error between the signal outputted by the neural network for the learning and the label signal may be used as the learning error. As one example, an error represented by an equation 3 may be used. Note that w represents a vector that includes a weight of whole of the network structure as a value, b represents a vector that includes a bias of whole of the network structure as a value, "E(w,b)" in the equation 3 represents the learning error in which the weight w and the bias b are variable number. "Y'(w,b)" in the equation 3 represents the signal outputted by the neural network for the learning. "Y" in the equation 3 represents the label signal. Note that any norm may be used as a norm for indicating the error. For example, a L1 norm or a L2 norm may be used as a norm for indicating the error.

$$E(w,b)=\|Y'(w,b)-Y\|^2 \quad \text{[Equation 3]}$$

When the parameters of each of the network structure $NS^{(2)}$ to the network structure $NS^{(j-1)}$ are inputted, the first learning unit 2211 learns the weight $w'^{(j)}$ while fixing (namely, not changing) the parameters of each of the network structure $NS^{(2)}$ to the network structure $NS^{(j-1)}$. Namely, the first learning unit 2211 learns the weight $w'^{(j)}$ while satisfying a constraint condition represented by an equation 4. "const" in the equation 4 means constant. Thus, the constraint condition represented by the equation 4 means "the parameters of each of the network structure $NS^{(2)}$ to the network structure $NS^{(j-1)}$ are not changed".

$$\text{s.t. } w^{(p)}=\text{const}, b^{(p)}=\text{const}(p=2, \ldots, j-1) \quad \text{[Equation 4]}$$

After the first learning unit 2111 completes learning the weight $w'^{(j)}$, then, the connection path selection unit 2112 selects a valid path that is used as a valid connection path in the neural network 112 from a plurality of connection paths that connect the plurality of nodes included in two layers corresponding to the parameter determination unit $211^{(j)}$ on the basis of the weight $w'^{(j)}$ learned by the first learning unit 2111 (a step S12).

Specifically, the connection path selection unit 2112 selects, as the valid path, the connection path, the number of which is equal to or larger than 1 and is smaller than M(j−1), from M(j−1) connection paths that connect each node $N^{(j)}$ included in the [j]-th layer and the $M^{(j-1)}$ nodes $N^{(j-1)}$ included in the [j−1]-th layer. Thus, at least one of the M(j−1) connection paths is not selected as the valid path. The connection path selection unit 2112 performs this operation for selecting the valid path for each of the M(j) node N(j) included in the [j]-th layer. Namely, the connection path selection unit 2112 selects at least one valid path that is connected to the first node $N_1^{(j)}$ of the [j]-th layer, selects at least one valid path that is connected to the second node $N_2^{(j)}$ of the [j]-th layer, . . . , and selects at least one valid path that is connected to the [M(j)]-th node $N_{M(j)}^{(j)}$ of the [j]-th layer.

The connection path selection unit 2112 selects, as the valid path, the connecting path, the number of which is equal to or larger than 1 and is smaller than M(j−1), from M(j−1) connection paths in an order of increasing absolute value of the weight $w'^{(j)}$ corresponding to each connecting path. Namely, the connection path selection unit 2112 selects, as the valid path, the connecting path, the number of which is equal to or larger than 1 and is smaller than M(j−1), having the weight $w'^{(j)}$ the absolute value of which is larger than that of the non-selected connection path from the M(j−1) connection paths. This is because the connecting path having the relatively small weight $w'^{(j)}$ has a relatively smaller contribution to the output of the neural network 112 than the connecting path having the relatively large weight $w'^{(j)}$. Specifically, the connection path selection unit 2112 selects the valid path on the basis of an equation 5. "$IU_r^{(j)}$" in the equation 5 represents an index of the valid path that is selected for the [r]-th node $N_r^{(j)}$ of the [j]-th layer (specifically, an index number of the node N of the [j−1]-th layer to which the selected valid path is connected). Note that the variable number r is an integer that is equal to or larger than 1 and is equal to or smaller than M(j). "$w'_{s,r}^{(j)}$" in the equation 5 represents the weight in the connection path between the [r]-th node $N_r^{(j)}$ of the [j]-th layer and the [s]-th node $N_s^{(j-1)}$ of the [j−1]-th layer. "$NU_r^{(j)}$" in the equation 5 represents the number of the selected valid number. "argmax$_q$" in the equation 5 represents a function that returns top q indexes having the largest values and "argmax" in the equation 5 represents a function that returns the maximum index. "$IU_r^{(j)}$" in the equation 5 is defined by an equation 6 and an equation 7 inductively.

$$IU_r^{(j)} = \arg\max\nolimits_{NU_r^{(j)}}(\{|w'^{(j)}_{s,r}| \mid s=1, \ldots M(j-1)\}) \quad \text{[Equation 5]}$$

$$\arg\max\nolimits_1(U)=\arg\max(U) \quad \text{[Equation 6]}$$

$$\arg\max\nolimits_q(U)=\arg\max\nolimits_{q-1}(U)\cup\arg\max(U/U_{\arg\max_{q-1}(U)}),$$
$$(q>1) \quad \text{[Equation 7]}$$

The number $NU_r^{(j)}$ of the selected valid path is a value that is equal to or larger than 1. A default initial value (note that a value that is smaller than M(j−1)) may be used as the number $NU_r^{(j)}$ of the selected valid path. Alternatively, the connection path selection unit 2112 may change the number $NU_r^{(j)}$ of the selected valid path on the basis of a learned result of the parameters. For example, when the learning error is larger than a target value (namely, an objective value) as a result of the learning of the parameters, the connection path selection unit 2112 may change (for example, increase by one) the number $NU_r^{(j)}$ of the selected valid path on the basis of a learned result of the parameters. In this case, the connection path selection unit 2112 may change the number $NU_r^{(j)}$ of the selected valid path so that the learning error is smaller than the target value. On the other hand, when the learning error is smaller than the target value as a result of the learning of the parameters, the connection path selection unit 2112 may not change the number $NU_r^{(j)}$ of the selected valid path.

On the other hand, the connection path that is not selected by the connection path selection unit 2112 is not used as the valid connecting path in the neural network 112. Namely, the nodes are not connected through the connection path that is not selected by the connection path selection unit 2112 in the neural network 112 based on the parameters that are determined by the parameter determination apparatus 2. Thus, an operation for selecting the valid path is substantially equivalent to an operation for determining the connecting aspect $CA^{(j)}$. Therefore, the connection path selection unit 2112 may output an information relating to the valid path (for example, the above described index $IU_r^{(j)}$) as the connecting aspect $CA^{(j)}$.

Then, after the connection path selection unit 2112 completes selecting the valid path, the second learning unit 2113 learns (namely, updates or determines) the parameters of the network structure $NS^{(j)}$ corresponding to the parameter determination unit 211$^{(j)}$ (a step S13). Specifically, the second learning unit 2113 learns at least one of the weight $w^{(j)}$ and the bias $b^{(j)}$ in the network structure $NS^{(j)}$ corresponding to the parameter determination unit 211$^{(j)}$. Preferably, the second learning unit 2113 learns both of the weight $w^{(j)}$ and the bias $b^{(j)}$. In the below described description, the second learning unit 2113 is regarded to learn both of the weight $w^{(j)}$ and the bias $b^{(j)}$ for convenience of description.

Specifically, when j=2, the second learning unit 2113 learns the weight $w^{(2)}$ and the bias $b^{(2)}$ on the basis of the sample signal and the label signal. Thus, the sample signal and the label signal are inputted to the second learning unit 2113 of the parameter determination unit 221$^{(2)}$. When j≥3, the second learning unit 2113 learns the weight $w^{(j)}$ and the bias $b^{(j)}$ on the basis of the sample signal, the label signal and the parameters of each of the network structure $NS^{(2)}$ to the network structure $NS^{(j-1)}$ that are located at the upstream side of the network structure $NS^{(j)}$ corresponding to the parameter determination unit 211$^{(j)}$. Namely, the second learning unit 2113 learns the weight $w^{(j)}$ and the bias $b^{(j)}$ on the basis of the sample signal, the label signal, the weight $w^{(2)}$ to the weight $w^{(j-1)}$, the bias $b^{(2)}$ to the bias $b^{(j-1)}$ and the connecting aspect $CA^{(2)}$ to the connecting aspect $CA^{(j-1)}$. Thus, the sample signal, the label signal and the parameters of each of the network structure $NS^{(2)}$ to the network structure $NS^{(j-1)}$ are inputted to the second learning unit 2113 of the parameter determination unit 211$^{(j)}$.

The second learning unit 2113 inputs the sample signal to the neural network for the learning that is used for the learning by the first learning unit 2111. Then, the second learning unit 2113 changes the weight $w^{(j)}$ and the bias $b^{(j)}$ of the neural network for the learning so as to reduce (preferably, minimize) the error between the signal outputted by the neural network for the learning and the label signal. As a result, the learning of the weight $w^{(j)}$ and the bias $b^{(j)}$ of the neural network for the learning is completed. The weight $w^{(j)}$ and the bias $b^{(j)}$ of the neural network for the learning is usable as the weight $w^{(j)}$ and the bias $b^{(j)}$ of the neural network 112.

The second learning unit 2113 does not use, as the valid connection path, the connection path that is not selected by the connection path selection unit 2112. Namely, the second learning unit 2113 learns the parameters under such a condition that the nodes N are not connected through the connection path that is not selected by the connection path selection unit 2112. Thus, the second learning unit 2113 learns the weight $w^{(j)}$ and the bias $b^{(j)}$ while satisfying a constraint condition represented by equation 8 in addition to the above described constraint condition that is represented by the equation 4 and that is used by the first learning unit 2111. Note that the equation 8 represents such a constraint condition that the nodes are not connected through the connection path that is not selected by the connection path selection unit 2112 (namely, the weight w of this connection path is zero). An expression of an equation 9 included in the equation 8 represents an index that is not included in $IU_r^{(j)}$. "$w_{s,r}^{(j)}=0$" in the equation 8 means that the weight that is not selected by $IU_r^{(j)}$ described above is set to be zero.

$$s.t.\ \{w_{s,r}^{(j)}=0 | s \notin IU_r^{(j)}=1,\ldots,M(j)\} \qquad \text{[Equation 8]}$$

$$s \notin IU_r^{(j)} \qquad \text{[Equation 9]}$$

The operation illustrated in FIG. 3 described above is performed by the plurality of parameter units 211 in sequence. Specifically, the parameter determination unit 211$^{(2)}$ learns the weight $w^{(2)}$, the bias $b^{(2)}$ and the connecting aspect $CA^{(2)}$. Then, the parameter determination unit 211$^{(3)}$ learns the weight $w^{(3)}$, the bias $b^{(3)}$ and the connecting aspect $CA^{(3)}$ by using the weight $w^{(2)}$, the bias $b^{(2)}$ and the connecting aspect $CA^{(2)}$ that are learned by the parameter determination unit 211$^{(2)}$. Then, the parameter determination unit 211$^{(4)}$ learns the weight $w^{(4)}$, the bias $b^{(4)}$ and the connecting aspect $CA^{(4)}$ by using the weight $w^{(2)}$, the bias $b^{(2)}$ and the connecting aspect $CA^{(2)}$ that are learned by the parameter determination unit 211$^{(2)}$ and the weight $w^{(3)}$, the bias $b^{(3)}$ and the connecting aspect $CA^{(3)}$ that are learned by the parameter determination unit 211$^{(3)}$.

However, the parameter determination unit 211$^{(4)}$ that learns the parameters relating to the network structure $NS^{(4)}$ between the second hidden layer 112M$^{(3)}$ and the output layer 112O may learn the parameters by a method different from that of another parameter determination unit 211. This is because the output layer 112O does not include the activation function in some cases as described above. For example, when the output layer 112O does not includes the activation function, the parameter determination unit 211$^{(4)}$ may learn the parameters by using an optimization method used in a compressed sensing. At least one of an OMP method (Orthogonal Matching Pursuit), a LS (Least Support)-OMP method and a BS method (Basic Pursuit) is one example of the optimization method used in the compressed sensing.

The parameter determination apparatus 2 may determine the parameters of the neural network 112 before the signal transmission apparatus 1 is shipped. As a result, the signal transmission apparatus 1 in which the neural network 112 based on the parameters determined by the parameter determination apparatus 2 is implemented in a manufacturing factory, for example, is shipped. In this case, the parameter determination apparatus 2 may be typically implemented by using an apparatus (typically, a relatively fast processing apparatus such as a GPU) outside the signal transmission apparatus 1. However, as described later, at least a part of the parameter determination apparatus 2 may be implemented in the signal transmission apparatus 1. The parameter determination apparatus 2 may determine the parameters of the neural network 112 after the signal transmission apparatus 1 is shipped (for example, during an operation of the signal transmission apparatus 1).

<2-5> Technical Effect of Parameter Determination Apparatus 2

According to the above described parameter determination apparatus 2 in the first example embodiment, the neural network 112 having small connections over all layers (=small processing amount) and small learning error (namely, a performance of the distortion compensation is high) is generated.

Specifically, the parameter determination apparatus 2 is capable of determining the parameters of the neural network 112 so as to build the neural network 112 having a sparse structure by performing the learning to which the selection of the connection path of the nodes N is added as the constraint condition (namely, the learning using the constraint condition illustrated in the above described equation 8). As one example, the parameter determination apparatus 2 is capable of determining the parameters of the neural network 112 so as to build the neural network 112 having a sparse structure that should be inherent in a physical model by performing the learning using the constraint condition based on a constraint that should be inherent in the physical model of the power amplifier 12 in the signal transmission apparatus 1 using the neural network 112 (specifically, the constraint condition relating to the selection of the connection path of the nodes N). Specifically, when assuming that the basis of the physical model of the amplifier 12 (a polynomial equation) corresponds to the outputs of the nodes N of the neural network 112, the number of the connections between one node $N^{(j)}$ in the [j]-th layer and the plurality of nodes $N^{(j-1)}$ in the [j−1]-th layer is smaller than the number of the connections that is allowed to be expressed in the neural network 112 (specifically, the number of the nodes $N^{(j-1)}$ included in the [j−1]-th layer). Focusing on this viewpoint the parameter determination apparatus 2 limits the number of the connections from the nodes $N^{(j-1)}$ included in the [j−1]-th layer (specifically, limits it to be smaller than the number of the nodes $N^{(j-1)}$ included in the [j−1]-th layer) and then learns the parameters. As a result, the neural network 112 having the utmost sparse structure is generated while keeping the performance (the performance of the distortion compensation). Thus, it can be said that the parameter determination apparatus 2 performs an operation for extracting a sparse model based on the physical model from the neural network 112.

<3> Modified Example of Parameter Determination Apparatus 2

Next, a modified example of the parameter determination apparatus 2 will be described. Note that a detailed description of a component that is already described will be omitted by assigning a same reference sign thereto in the below described description. Similarly, a detailed description of a processing that is already described will be omitted by assigning a same step number thereto in the below described description.

<3-1> Parameter Determination Apparatus 2a in First Modified Example

Figure 7:
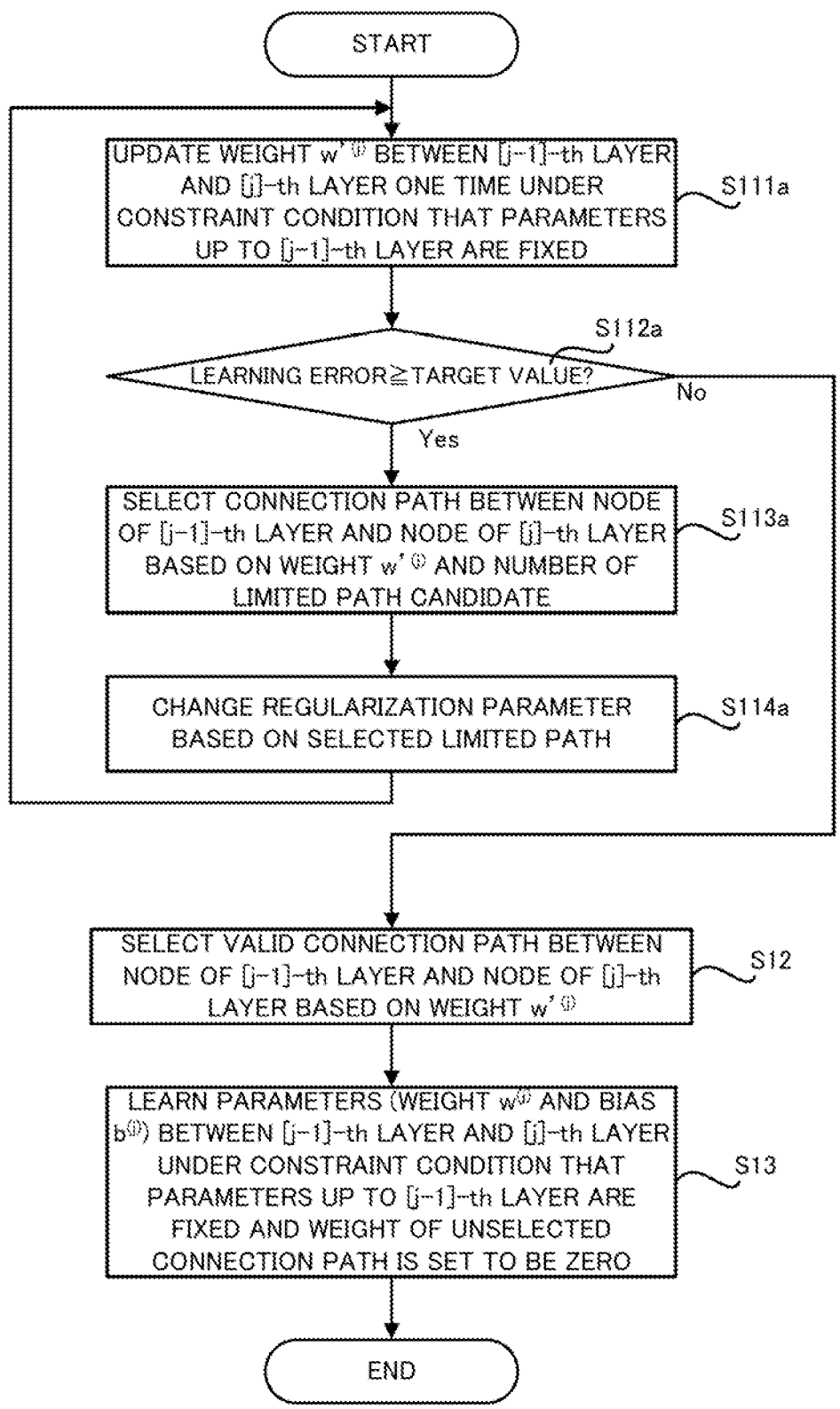
FIG. 7 is a flow chart that illustrates a flow of an operation of a parameter determination unit in a first modified example.

Firstly, a parameter determination apparatus 2a in a first modified example will be described. The parameter determination apparatus 2a in the first modified example has a structure that is same as that of the above described parameter determination apparatus 2. The parameter determination apparatus 2a in the first modified example is different from the above described parameter determination apparatus 2 in that the operation performed by the parameter determination unit 211 is partially different. Therefore, in the below described description, the operation performed by the parameter determination unit 211 in the first modified example will be described with reference to FIG. 7. FIG. 7 is a flowchart that illustrates a flow of the operation performed by the parameter determination unit 211 in the first modified example.

As illustrated in FIG. 7, in the first modified example, the first learning unit 2111 firstly updates the weight $w'^{(j)}$ in the network structure $NS^{(j)}$ one time while satisfying the constraint condition represented by the above described equation 4 (a step S111a). Note that the method of updating the weight $w'^{(j)}$ may be same as the method of updating the weight $w'^{(j)}$ at the step S11 in FIG. 6 except for the number of times to update is one time.

However, in the first modified example, a regularization term is used when the weight $w'^{(j)}$ is updated. Namely, the first learning unit 2111 updates the weight $w'^{(j)}$ by using an objective function to which the regularization term is added. As one example, the first learning unit 2111 may update the weight $w'^{(j)}$ by using an objective function to which a regularization term relating to the weight w and a regularization term relating to the bias b are added. However, the regularization term relating to the bias b may not be added. One example of this objective function is represented by an equation 10. "L(w, b)" in the equation represents the objective function. "$\lambda_w^{(l)}$" in the equation 10 represents a regularization parameter relating to the weight $w^{(l)}$ between the [l−1]-th layer and the [l]-th layer. "$\lambda_b^{(l)}$" in the equation 10 represents a regularization parameter relating to the bias $b^{(l)}$ between the [l−1]-th layer and the [l]-th layer. "L" in the equation 10 is a constant number that represents the number of the layers included in the neural network 112. Note that any norm may be used as a norm in the objective function L(w, b). For example, a L1 norm or a L2 norm may be used as the norm in the objective function L(w, b). For example, a Lp (note that p is an integer that is equal to or larger than 3) norm may be used as the norm in the objective function L(w, b). In this case, it can be said that the regularization term is a component that becomes larger as a total sum of an absolute value of the weight $w^{(l)}$ or an exponentiation of the absolute value becomes larger.

$$L(w, b) = E(w, b) + \sum_{l=2}^{L} \lambda_w^{(l)} \|w'^{(l)}\| + \sum_{l=2}^{L} \lambda_b^{(l)} \|b^{(l)}\| \qquad \text{[Equation 10]}$$

A default initial value may be used as each of the regularization parameters $\lambda_w^{(l)}$ and $\lambda_b^{(l)}$. Alternatively, the connection path selection unit 2112 may change at least one of the regularization parameters $\lambda_w^{(l)}$ and $\lambda_b^{(l)}$ on the basis of the learned result of the parameters. For example, when the learning error is larger than the target value as a result of the learning of the parameters, the connection path selection unit 2112 may change at least one of the regularization parameters $\lambda_w^{(l)}$ and $\lambda_b^{(l)}$ on the basis of the learned result of the parameter. In this case, the connection path selection unit 2112 may change at least one of the regularization parameters $\lambda_w^{(l)}$ and $\lambda_b^{(l)}$ so that the learning error is smaller than the target value. On the other hand, for example, when the learning error is smaller than the target value as a result of the learning of the parameters, the connection path selection unit 2112 may not change at least one of the regularization parameters $\lambda_w^{(l)}$ and $\lambda_b^{(l)}$ on the basis of the learned result of the parameter.

In the first modified example, the first learning unit 2111 updates the weight $w'^{(j)}$ by using the objective function L(w, b) while satisfying the constraint condition represented by the above described equation 4. In this case, any algorithm that is used for the learning of the neural network is usable as an algorithm for soling an optimization problem relating to the objective function L(w, b). As one example, the first learning unit 2111 may use at least one of a Stochastic Gradient Descent (SGD) and an Adaptive Moment Estimation (ADAM).

The first learning unit 2111 may update the weight $w'^{(j)}$ by a unit of one batch in the learning of the neural network 112. The first learning unit 2111 may the weight $w'^{(j)}$ by a unit of an epoch. The same also applies to second and third modified examples described later.

Then, the first learning unit 2111 determines whether or not the learning error is equal to or larger than the target value (a step S112a). As a result of the determination at the step S112a, when it is determined that the learning error is smaller than the target value (the step S112a: No), the first learning unit 2111 ends the learning of the weight $w'^{(j)}$. Then, also in the first modified example, the connection path selection unit 2112 selects the valid path (the step S12) and the second learning unit 2113 learns the weight $w^{(j)}$ and the bias $b^{(j)}$ (the step S13).

On the other hand, as a result of the determination at the step S112a, when it is determined that the learning error is equal to or larger than the target value (the step S112a: Yes), the first learning unit 2111 selects the connection path having the weight $w'^{(j)}$ that is easier to be updated to be relatively large (hereinafter, it is referred to as a "limited path") from the plurality of that connect the plurality of nodes included in two layers corresponding to the parameter determination unit $211^{(j)}$ (a step S113a)

Specifically, the first learning unit 2111 selects, as the limited path, the connection path, the number of which is equal to or larger than 1 and is smaller than M(j−1), from M(j−1) connection paths that connect each node $N^{(j)}$ included in the [j]-th layer and the M(j−1) nodes $N^{(j-1)}$ included in the [j−1]-th layer. Thus, at least one of the M(j−1) connection paths is not selected as the limited path. The first learning unit 2111 performs this operation for selecting the limited path for each of the M(j) node $N^{(j)}$ included in the [j]-th layer. Namely, the first learning unit 2111 selects at least one limited path that is connected to the first node $N_1^{(j)}$ of the [j]-th layer, selects at least one limited path that is connected to the second node $N_2^{(j)}$ of the [j]-th layer, . . . , and selects at least one limited path that is connected to the [M(j)]-th node $N_{M(j)}^{(j)}$ of the [j]-th layer.

The first learning unit 2111 selects, as the limited path, the connecting path, the number of which is equal to or larger than 1 and is smaller than M(j−1), from M(j−1) connection paths in each node $N^{(j)}$ in an order of increasing absolute value of the weight $w'^{(j)}$ corresponding to each connecting path. In other words, the first learning unit 2111 selects, as the limited path, the connecting path, the number of which is equal to or larger than 1 and is smaller than M(j−1), having the weight $w'^{(j)}$ the absolute value of which is larger than that of the non-selected connection path from the M(j−1) connection paths. Namely, the first learning unit 2111 selects the limited path by a method that is same as a method of selecting the valid path by the connection path selection unit 2112.

Specifically, the first learning unit 2111 selects the limited path on the basis of an equation 11. "$IU_r^{p,(j)}$" in the equation 10 represents an index of the limited path that is selected for the [r]-th node $N_r^{(j)}$ of the [j]-th layer (specifically, an index number of the node N of the [j−1]-th layer to which the selected limited path is connected). "$NU_r^{p,(j)}$" in the equation 11 represents the number of the selected limited number.

$$IU_r^{p,(j)} = \arg\max_{NU_r^{p,(j)}}(\{|w_{s,r}'^{(j)}| \mid s = 1, \ldots M(j-1)\})$$ [Equation 11]

The number $NU_r^{p,(j)}$ of the selected limited path is a value that is equal to or larger than 1. A default initial value (note that a value that is smaller than M(j−1)) may be used as the number $NU_r^{p,(j)}$ of the selected limited path. However, the number $NU_r^{p,(j)}$ of the limited path is set to be a value that is equal to or smaller than the number $NU_r^{(j)}$ of the above described valid path that is selected by the connection path selection unit 2112. For example, the number $NU_r^{p,(j)}$ of the limited path may be set to be a value that is equal to the number $NU_r^{(j)}$ of the valid path. For example, the number $NU_r^{p,(j)}$ of the limited path may be set to be a value that is smaller than the number $NU_r^{p,(j)}$ of the valid path by a predetermined number (for example, 1). For example, the number $NU_r^{p,(j)}$ of the limited path may be set to be 1. For example, the number $NU_r^{p,(j)}$ of the limited path may be set to be larger one value of 1 and a value that is obtained by subtracting 1 from the number $NU_r^{(j)}$ of the valid path.

Then, the first learning unit 2111 updates the objective function L(w, b) so that the learning by which the weight $w'^{(j)}$ of the limited path is larger than the weight $w'^{(j)}$ of the connecting path other than the limited path is easier to be performed (a step S114a). Namely, the first learning unit 2111 updates the objective function L(w, b) so that the weight $w'^{(j)}$ of the limited path is easier to be larger than the weight $w'^{(j)}$ of the connecting path other than the limited path. Here, the regularization parameter $\lambda_w^{(j)}$ is used to allow the weight $w'^{(j)}$ to be relatively small. The regularization parameter $\lambda_w^{(j)}$ corresponds to a constraint for allowing the weight $w'^{(j)}$ to be relatively small. Thus, when the constraint by the regularization parameter $\lambda_w^{(j)}$ is relaxed, the weight $w'^{(j)}$ is easier to be relatively large. Specifically, when the regularization parameter $\lambda_w^{(j)}$ becomes smaller, the weight $w'^{(j)}$ is easier to be relatively larger. Thus, the first learning unit 2111 may update the objective function L(w, b) so that the regularization term relating to the weight $w'^{(j)}$ of the limited path is smaller than the regularization term relating to the weight $w'^{(j)}$ of the connection path other than the limited path. The first learning unit 2111 may update the objective function L(w, b) represented by the equation 10 to be an objective function L'(w, b) represented by an equation 12.

[Equation 12]
$$L'(w, b) = L(w, b) + \alpha\lambda_w^{(l)}\sum_{r=1}^{M^{(j)}}\sum_{s \in IU_r^{p,(j)}}|w_{s,r}'^{(j)}| + \lambda_w^{(l)}\sum_{r=1}^{M^{(j)}}\sum_{s \notin IU_r^{p,(j)}}|w_{s,r}'^{(j)}|$$

"α" in the equation 12 is a value that is equal to or larger than 0 and that is equal to or smaller than 1. The regularization term relating to the weight $w'^{(j)}$ of the limited path becomes smaller as α becomes smaller. As a result, the weight $w'^{(j)}$ of the limited path is easier to be updated as α becomes smaller.

Then, the first learning unit 2111 performs the process at the step S111a again. Namely, the first learning unit 2111 updates the weight $w'^{(j)}$ one time again by using the updated objective function L'(w, b) (the step S111a). The above describe operation is repeated until the learning error is smaller than the target value. Specifically, the first learning unit 2111 updates the objective function L'(w, b) until the learning error is smaller than the target value.

Updating the objective function L'(w, b) after the objective function L(w, b) represented by the equation 10 is updated to be the objective function L'(w, b) may includes updating the variable number α. The first learning unit 2111 may update the variable number α until the learning error is smaller than the target value. In this case, the first learning unit 2111 may update the variable number α so that the variable number α monotonously decreases. For example, the first learning unit 2111 may update the variable number α so that the variable number α an initial value of which is set to be 1 monotonously decreases. For example, the first learning unit 2111 may update the variable number α so as to multiply the variable number α by a number that is smaller than 1 every time the variable number α is updated. The first learning unit 2111 may update the variable number α so as to subtract a predetermined amount from the variable number α every time the variable number α is updated. When the variable number α monotonously decreases in this manner, the constraint by the regularization term is gradually relaxed as the weight $w'^{(j)}$ is learned more. Namely, an effect that is achievable by selecting the limited value increases more as the weight $w'^{(j)}$ is learned more by the first learning unit 2111.

The above described parameter determination apparatus 2a in the first modified example is capable of achieving an effect that is same as the effect achievable of the parameter determination apparatus 2. Furthermore, in the parameter determination apparatus 2a, the first learning unit 2111 is capable of selecting the limited path having the weight $w'^{(j)}$ that is easier to be updated. Thus, the weight $w'^{(j)}$ of the connection path that is estimated not to be selected as the valid path by the connection path selection unit 2112 is sufficiently larger than the weight $w'^{(j)}$ of the connection path that is estimated to be selected as the valid path by the connection path selection unit 2112 at a timing when the learning of the weight $w'^{(j)}$ by the first learning unit 2111 is completed. Thus, there is a smaller possibility that such a technical inexpedience that the connection path selection unit 2112 does not select (namely, delete) the connection path having the relatively large weight $w'^{(j)}$ occurs. If the connection path selection unit 2112 does not select (namely, delete) the connection path having the relatively large weight $w'^{(j)}$, an effect on the learning error by the non-use of this connection path is relatively large. Namely, a validity of the selection of the valid path by the connection path selection unit 2111 is small, and as a result, it results in a deterioration of the learning effect. However, in the first modified example, there is a small possibility that the deterioration of the learning effect occurs.

Note that the objective function L(w, b) used by the first learning unit 2111 may be used when the second learning unit 2113 learns the parameters. In this case, the variable number α at the timing when the learning of the weight $w'^{(j)}$ by the first learning unit 2111 is completed may be used as the variable number α. The same also applies to the second and third modified examples described later.

Moreover, the equation 12 to which the regularization term of the bias b in the equation 10 (see an equation 13) is added may be used as the objective function.

$$\sum_{l=2}^{L} \lambda_b^{(l)} \|b^{(l)}\|$$ [Equation 13]

<3-2> Parameter Determination Apparatus 2b in Second Modified Example

Figure 8:
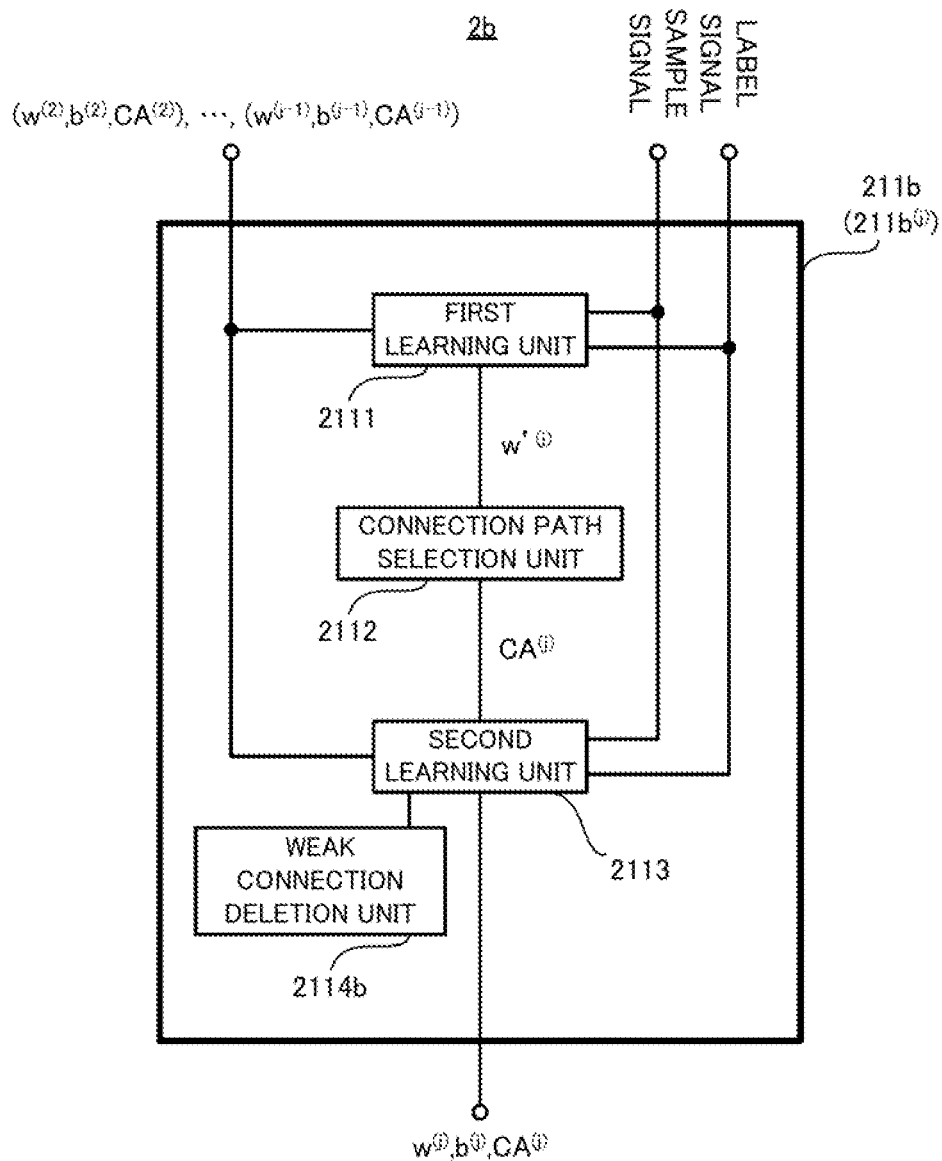
FIG. 8 a block diagram that illustrates a configuration of a parameter determination unit in a second modified example.

Next, a parameter determination apparatus 2b in a second modified example will be described. The parameter determination apparatus 2b in the second modified example is different from the above described parameter determination apparatus 2 in that it includes a parameter determination unit 211b instead of the parameter determination unit 211. Another feature of the parameter determination apparatus 2b may be same as another feature of the above described parameter determination apparatus 2. Therefore, in the below described description, the parameter determination unit 211b in the second modified example will be described with reference to FIG. 8. FIG. 8 is a block diagram that illustrates a configuration of the parameter determination unit 211b in the second modified example.

As illustrated in FIG. 8, the parameter determination unit 211b is different from the parameter determination unit 211 in that it includes a weak connection deletion unit 2114b. Another feature of the parameter determination unit 211b may be same as another feature of the above described parameter determination unit 211.

Figure 9:
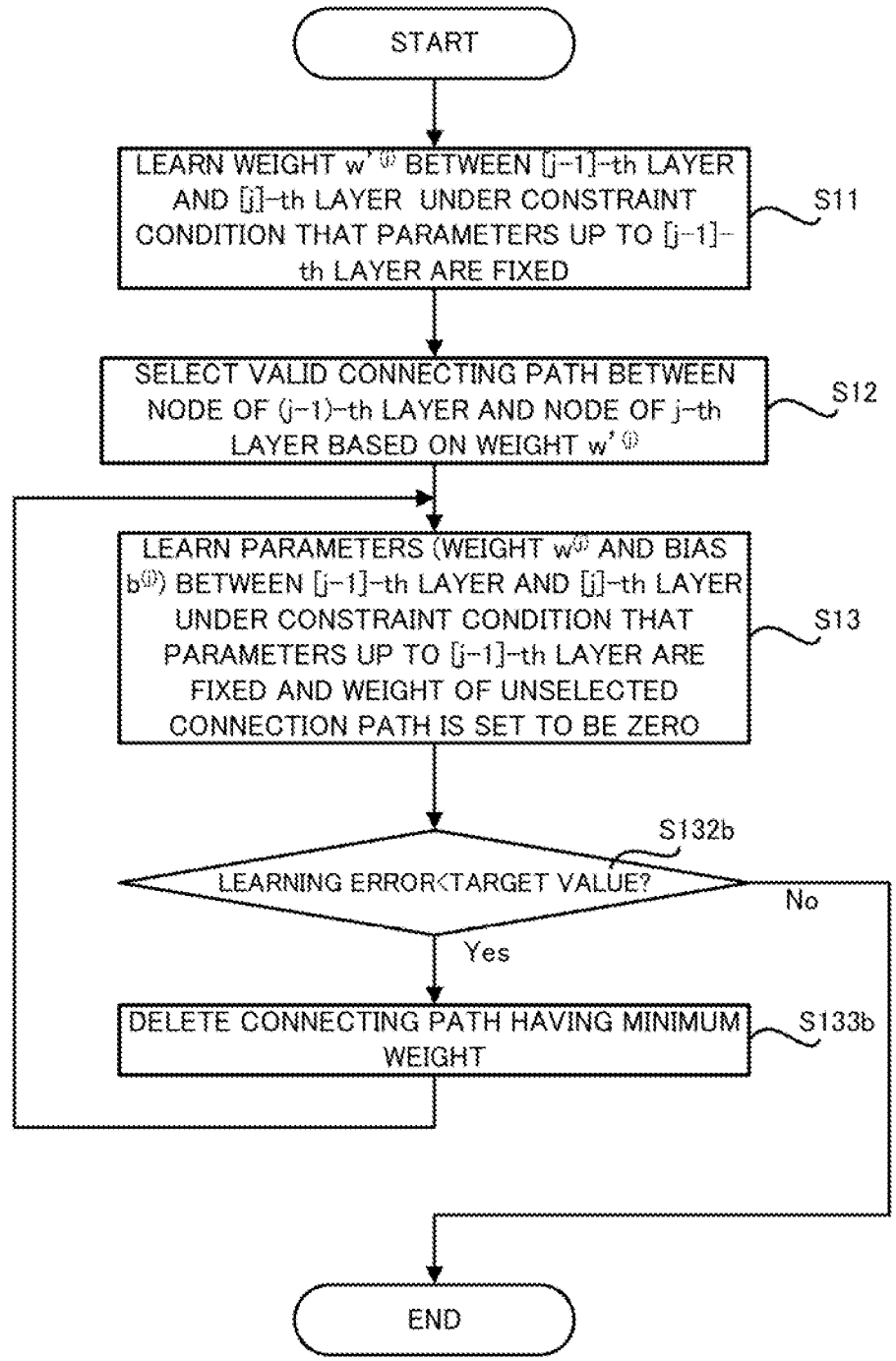
FIG. 9 is a flow chart that illustrates a flow of an operation of the parameter determination unit in the second modified example.

When the connection path that is selected as the valid path by the connection path selection unit 2112 satisfies a weak connection condition, the weak connection deletion unit 2114b deletes this connection path (namely, eliminates it from a designation of the valid path), in the process of the second learning unit 2113 learning the parameters. Next, with reference to FIG. 9, an operation of the parameter determination unit 211b in the second modified example that performs this operation will be described. FIG. 9 is a flowchart that illustrates a flow of the operation of the parameter determination unit 211b in the second modified example.

As illustrated in FIG. 9, also in the second modified example, the first learning unit 2111 learns the weight $w'^{(j)}$ (the step S11), the connection path selection unit 2112 selects the valid path (the step S12) and the second learning unit 2113 learns the weight $w^{(j)}$ and the bias $b^{(j)}$ (the step S13).

Then, the second learning unit 2113 determines whether or not the learning error is smaller than the target value (a step S132b). As a result of the determination at the step S132b, when it is determined that the learning error is not smaller than the target value (the step S132b: No), it is estimated that there is relatively small room for deleting the valid path. Namely, it is estimated that the learning error possibly becomes larger than expected if the valid path is deleted. In this case, the second learning unit 2113 ends the learning of the weight $w^{(j)}$ and the bias $b^{(j)}$.

On the other hand, as a result of the determination at the step S132b, when it is determined that the learning error is smaller than the target value (the step S132b: Yes), it is estimated that there is relatively large room for deleting the valid path. Namely, it is estimated that the learning error can be possibly maintained to be smaller than the target value even if the valid path is deleted. Thus, the weak connection deletion unit 2114b deletes the valid path having the weight $w^{(j)}$ the absolute value of which is minimum from the plurality of valid paths (a step S133b).

Specifically, the weak connection deletion unit 2114b calculates a connection strength $R_{s,r}$ of the connection path (the valid path) between the [r]-th node $N_r^{(j)}$ of the [j]-th layer and the [s]-th node $N_s^{(j-1)}$ of the [j−1]-th layer for each of all combinations of the node $N_r^{(j)}$ and the node $N_s^{(j-1)}$. The connection strength $R_{s,r}$ is an index value based on the absolute value $|w_{s,r}^{(j)}|$ of the weight $w_{s,r}^{(j)}$ of the connection path between the node $N_r^{(j)}$ and the node $N_s^{(j-1)}$. For example, the connection strength $R_{s,r}$ may be a ratio of an absolute value $|w_{smax,r}^{(j)}|$ of a maximum value of the weight $w^{(j)}$ of the connection paths connected to the node $N_r^{(j)}$ to the absolute value $|w_{s,r}^{(j)}|$ of the weight $w_{s,r}^{(j)}$ of the connection path between the node $N_r^{(j)}$ and the node $N_s^{(j-1)}$. Namely, the weak connection deletion unit 2114b may calculates the connection strength $R_{s,r}$ by using an equation 14. However, the connection strength $R_{s,r}$ may be any value as long as it is correlated to the absolute value of the weight $w^{(j)}$. For example, the absolute value of the weight $w^{(j)}$ itself may be used as the connection strength $R_{s,r}$.

$$R_{s,r}=|w_{s,r}^{(j)}|/|w_{smax,r}^{(j)}|, smax= \operatorname{argmax}\{|w_{s,r}^{(j)}| | s \in IU_r^{(j)}\} \ (r=1,\ldots,M(j)) \quad \text{[Equation 14]}$$

Then, the weak connection deletion unit 2114b determines the valid path having the minimum connection strength $R_{s,r}$ among the plurality of valid paths (namely, the connection paths that are not deleted yet). In this case, the weak connection deletion unit 2114b may determine the valid path having the minimum connection strength $R_{s,r}$ by using an equation 15. "smin" in the equation 15 represents an index of the node $N_{smin}^{(j-1)}$ that is included in the [j−1]-th layer and that is connected to the valid path having the minimum connection strength $R_{s,r}$. "rmin" in the equation 13 represents an index of the node $N_{rmin}^{(j)}$ that is included in the [j]-th layer and that is connected to the valid path having the minimum connection strength $R_{s,r}$. "argmim" in the equation 13 represents a function that returns the minimum index.

$$(smin,rmin)=\operatorname{argmin}\{R_{s,r} | s \in IU_r^{(j)}, r=1,\ldots M(j)\} \quad \text{[Equation 15]}$$

Then, the weak connection deletion unit 2114b deletes a label smin of the determined valid path from the index $IU_{rmin}^{(j)}$ that represents the valid path. Namely, the weak connection deletion unit 2114b updates the index $IU_{rmin}^{(j)}$ by using an equation 16. As a result, the constraint represented by the equation 8 is updated to be such a condition that the weight $ws_{min,rmin}^{(j)}$ of the determined valid path is newly zero.

$$IU_{rmin}^{(j)} \leftarrow IU_{rmin}^{(j)}/\{smin\} \quad \text{[Equation 16]}$$

Incidentally, when there is the node $N^{(j)}$ in the [j]-th layer to which the output from the node $N^{(j-1)}$ of the [j−1]-th layer is not inputted due to the deletion of the connection path, this node $N^{(j)}$ itself may be deleted.

Then, the second learning unit 2113 performs the process at the step S13 again. Namely, the second learning unit 2113 learns the weight $w^{(j)}$ and the bias $b^{(j)}$ while satisfying the constraint based on the updated index $IU_{rmin}^{(j)}$ (the step S13). This operation is repeated until the learning error is equal to or larger than the target value.

The above described parameter determination apparatus 2b in the second modified example is capable of achieving an effect that is same as the effect achievable of the parameter determination apparatus 2. Furthermore, in the parameter determination apparatus 2b, a part of the valid paths selected by the connection path selection unit 2112 is deleted in the process of the second learning unit 2113 learning the parameters. Namely, an unnecessary valid path (namely, that has a relatively small contribution on the output of the neural network 112) is deleted in the process of the second learning unit 2113 learning the parameters. As a result, the processing amount of the neural network 112 is reduced more.

Note that the parameter determination apparatus 2b in the second modified example may perform an operation that is same as that of the parameter determination apparatus 2a in the first modified example (namely, an operation for learning the weight wo) by the objective function that includes the regularization parameter while selecting the limited path).

<3-3> Parameter Determination Apparatus 2c in Third Modified Example

Figure 10:
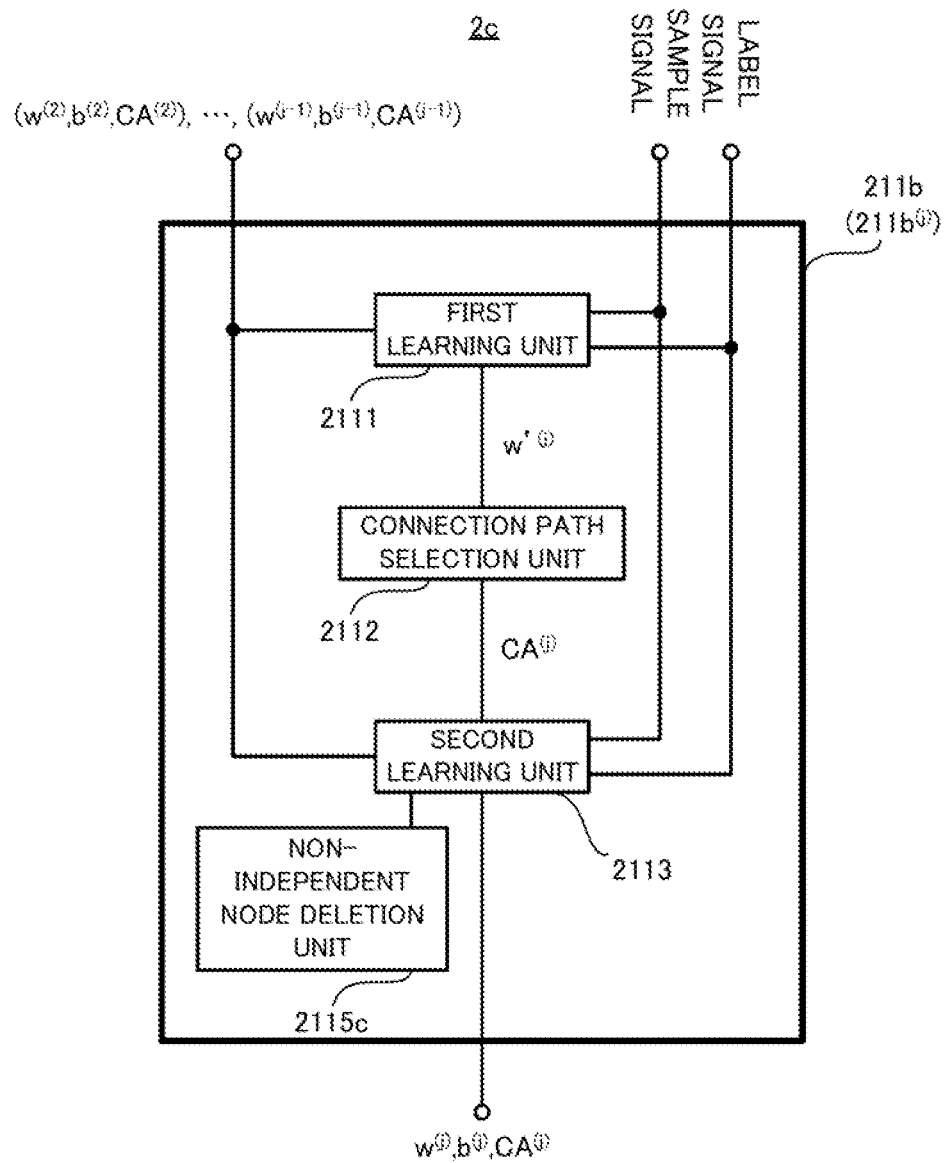
FIG. 10 a block diagram that illustrates a configuration of a parameter determination unit in a third modified example.

Next, a parameter determination apparatus 2c in a third modified example will be described. The parameter determination apparatus 2c in the third modified example is different from the above described parameter determination apparatus 2 in that it includes a parameter determination unit 211c instead of the parameter determination unit 211. Another feature of the parameter determination apparatus 2c may be same as another feature of the above described parameter determination apparatus 2. Therefore, in the below described description, the parameter determination unit 211c in the third modified example will be described with reference to FIG. 10. FIG. 10 is a block diagram that illustrates a configuration of the parameter determination unit 211c in the third modified example.

As illustrated in FIG. 10, the parameter determination unit 211c is different from the parameter determination unit 211 in that it includes a non-independent node deletion unit 2115c. Another feature of the parameter determination unit 211c may be same as another feature of the above described parameter determination unit 211.

Figure 11:
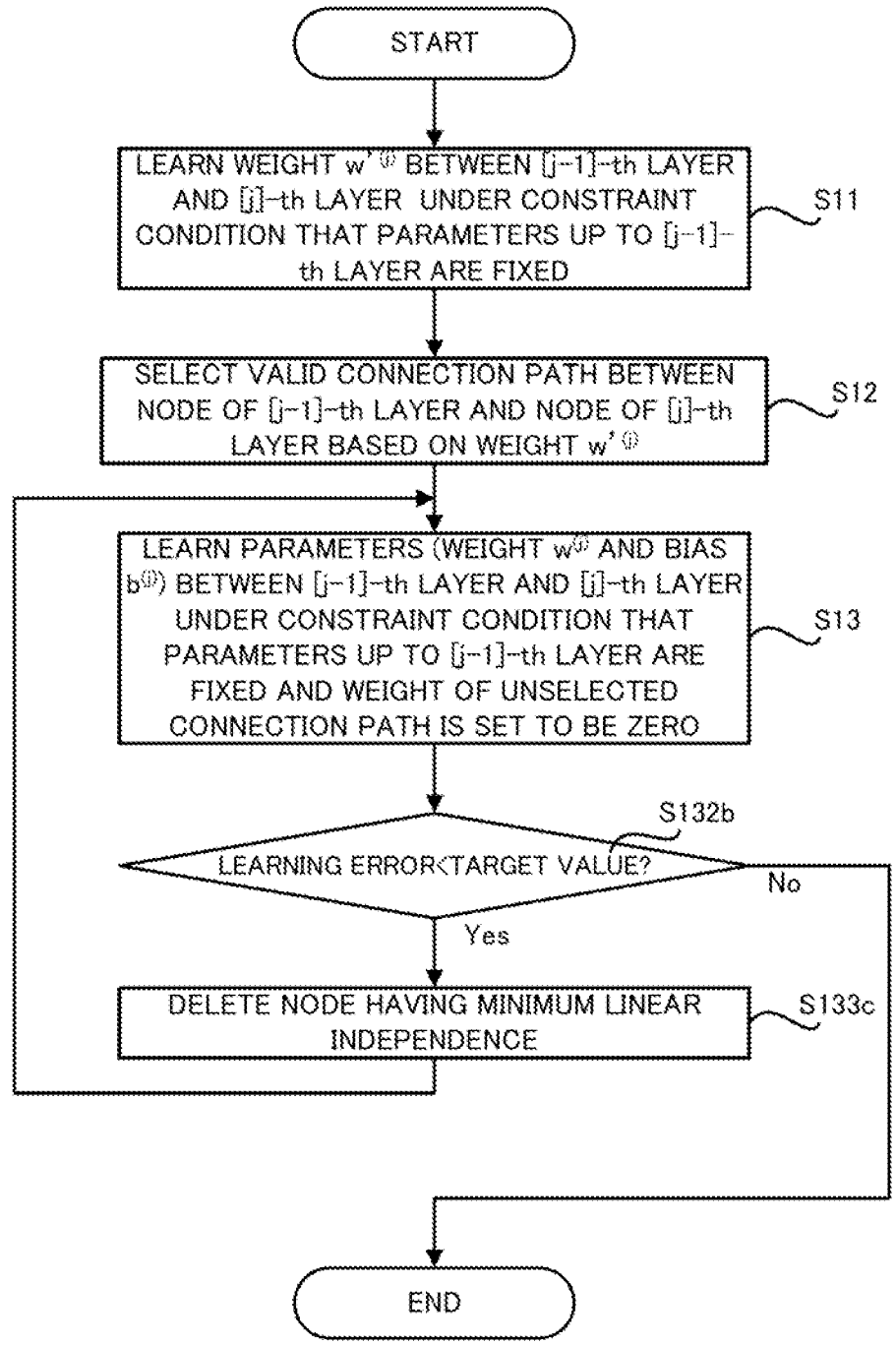
FIG. 11 is a flow chart that illustrates a flow of an operation of the parameter determination unit in the third modified example.

The non-independent node deletion unit 2115c deletes the node $N^{(j)}$ a linear independency of which is minimum (in other words, an orthogonal degree of which is minimum) in the process of the second learning unit 2113 learning the parameters. Namely, the non-independent node deletion unit 2115c deletes the node $N^{(j)}$ the output (an output vector) of which is most likely to be substantially expressed by a linear sum of the outputs (output vectors) of other nodes $N^{(j)}$. Even when the node $N^{(j)}$ the linear independency of which is minimum is deleted, the output of the neural network 112 are rarely affected heavily as long as the output of the node $N^{(j)}$ is substantially expressed by the linear sum of the outputs (the output vectors) of other nodes $N^{(j)}$. Next, with reference to FIG. 11, an operation of the parameter determination unit 211c in the third modified example that performs this operation will be described. FIG. 11 is a flowchart that illustrates a flow of the operation of the parameter determination unit 211c in the third modified example. As illustrated in FIG. 11, also in the third modified example, the first learning unit 2111 learns the weight $w'^{(j)}$ (the step S11), the connection path selection unit 2112 selects the valid path (the step S12), the second learning unit 2113 learns the weight $w^{(j)}$ and the bias $b^{(j)}$ (the step S13) and the second learning unit 2113 determines whether or not the learning error is smaller than the target value (the step S132b), as with the second modified example.

As a result of the determination at the step S132b, when it is determined that the learning error is not smaller than the target value (the step S132b: No), it is estimated that there is relatively small room for deleting the node $N^{(j)}$. Namely, it is estimated that the learning error possibly becomes larger than expected if the node $N^{(j)}$ is deleted. In this case, the second learning unit 2113 ends the learning of the weight $w^{(j)}$ and the bias $b^{(j)}$.

On the other hand, as a result of the determination at the step S132b, when it is determined that the learning error is smaller than the target value (the step S132b: Yes), it is estimated that there is relatively large room for deleting the node $N^{(j)}$. Namely, it is estimated that the learning error can be possibly maintained to be smaller than the target value even if the node $N^{(j)}$ is deleted. Thus, the non-independent node deletion unit 2115c deletes one node $N^{(j)}$ the linear independency of which is minimum (in other words, the orthogonal degree of which is minimum) from the nodes $N^{(j)}$ of the [j]-th layer (a step S133c).

Specifically, the non-independent node deletion unit 2115c calculates an independent degree $D_r$ (namely, an index indicating whether it is linear independent or not) of the [r]-th node $N_r^{(j)}$ of the [j]-th layer for each of all nodes $N_r^{(j)}$. The independent degree $D_r$ may be a residual norm of the output $H_r^{(j)}$ of the node $N_r^{(j)}$, for example. In this case, the independent degree Dr may be calculated by a following sequence. Firstly, the non-independent node deletion unit 2115c defines a matrix X that includes the outputs $H_1^{(j)}$ to $H_{M(j)}^{(j)}$ of the nodes $N_1^{(j)}$ to $N_{M(j)}^{(j)}$ of the [j]-th layer as $X=[H_1^{(j)}, H_2^{(j)}, H_{M(j)}^{(j)}]$. Furthermore, the non-independent node deletion unit 2115c defines a vector space Xm extending another output $H^{(j)}$ other than $H_r^{(j)}$ as $Xm=X/H_r^{(j)}$. Furthermore, the non-independent node deletion unit 2115c defines a residual vector $r_r$ so that the residual vector $r_r$, which is obtained by subtracting a linear sum of the vector space Xm (namely, a linear sum of basis vectors of the vector space Xm) from the output $H_r^{(j)}$ is orthogonal to the vector space Xm. Then, the non-independent node deletion unit 2115c calculates, as the independent degree $D_r$, a ratio of the residual vector $r_r$ and the norm. In this case, it can be said that the non-independent node deletion unit 2115c calculates the independent degree $D_r$ by using an equation 17 and an equation 18. The independent degree $D_r$ becomes smaller as the linear independency becomes smaller.

$$r_r = H_r^{(j)} - X_m \beta_m \ s.t. \ r_r \perp X_m \quad \text{[Equation 17]}$$

$$D_r = \|r_r\|/\|H_r^{(j)}\| \quad \text{[Equation 18]}$$

Then, the non-independent node deletion unit 2115c determines the node $N_{min}^{(j)}$ having the minimum independent degree $D_r$ among the plurality of nodes $N^{(j)}$ of [j]-th layer. In this case, the non-independent node deletion unit 2115c may determine the node $N_{min}^{(j)}$ having the minimum independent degree $D_r$ by using an equation 19. "rmin" in the equation 19 represents an index of the node $N_{rmin}^{(j)}$ that is included in the [j−1]-th layer and that has the minimum independent degree $D_r$.

$$r\min = \mathrm{argmin}(\{D_r | r=1, \ldots, M(j)\}) \quad \text{[Equation 19]}$$

The node $N_{rmin}^{(j)}$ corresponds to the node N having the smallest (in other words, lowest) linear independency. Namely, the node $N_{rmin}^{(j)}$ corresponds to the node N having the smallest (in other words, lowest) orthogonal degree. Thus, the non-independency node deletion unit 2115c deletes the determined node $N_{rmin}^{(j)}$. Furthermore, the non-independency node deletion unit 2115c deletes the weight $w_{s,rmin}^{(j)}$ and the bias $b_{rmin}^{(j)}$ relating to the determined node $N_{rmin}^{(j)}$. Furthermore, the non-independency node deletion unit 2115c may update the connecting aspect $CA^{(j)}$ relating to the determined node $N_{rmin}^{(j)}$.

Then, the second learning unit 2113 performs the process at the step S13 again. Namely, the second learning unit 2113 updates the index $IU_{rmin}^{(j)}$ in accordance with the node $N_{rmin}^{(j)}$ and update the total number M(j) of the nodes $N^{(j)}$ and then learns the weight $w^{(j)}$ and the bias $b^{(j)}$ again (the step S13). This operation is repeated until the learning error is equal to or larger than the target value.

The above described parameter determination apparatus 2c in the third modified example is capable of achieving an effect that is same as the effect achievable of the parameter determination apparatus 2. Furthermore, in the parameter determination apparatus 2c, a part of the nodes N is deleted in the process of the second learning unit 2113 learning the parameters. Namely, unnecessary part of the nodes N (namely, that has a relatively small contribution on the output of the neural network 112) is deleted in the process of the second learning unit 2113 learning the parameters. As a result, the processing amount of the neural network 112 is reduced more.

Note that the parameter determination apparatus 2c in the third modified example may perform an operation that is same as that of the parameter determination apparatus 2a in the first modified example (namely, the operation for learning the weight wo) by the objective function that includes the regularization parameter while selecting the limited path). The parameter determination apparatus 2c in the third modified example may perform an operation that is same as that of the parameter determination apparatus 2b in the second modified example (namely, an operation for deleting the valid path).

<4> Modified Example of Signal Transmission Apparatus 1

Next, a modified example of the signal transmission apparatus 1 will be described.

<4-1> Signal Transmission Apparatus 1a in First Modified Example

Figure 12:
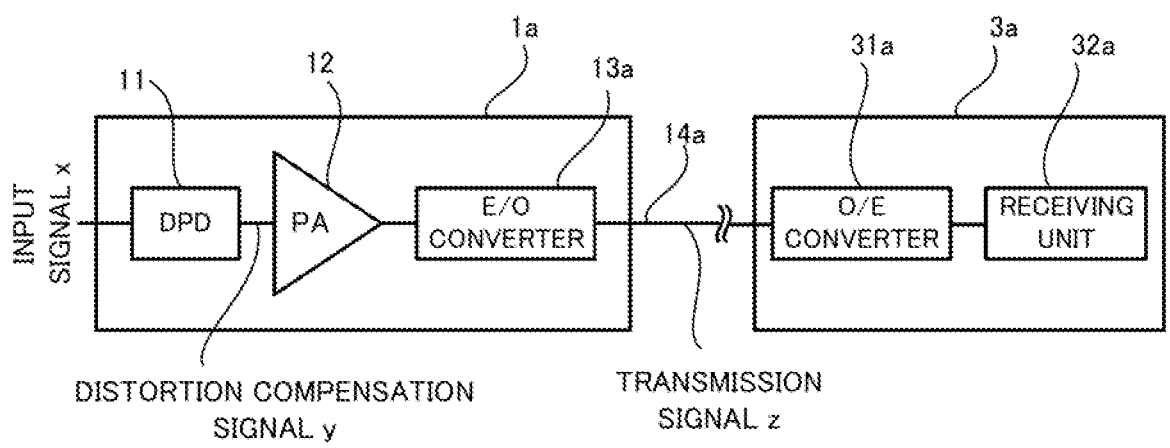
FIG. 12 is a block diagram that illustrates a configuration of a signal transmission apparatus in a first modified example.

Firstly, with reference to FIG. 12, a signal transmission apparatus 1a in a first modified example will be described. FIG. 12 is a block diagram that illustrates a configuration of the signal transmission apparatus 1a in the first modified example.

As illustrated in FIG. 12, the signal transmission apparatus 1a is different from the signal transmission apparatus 1 in that it may be an apparatus that transmits the transmission signal z through an optical communication network (for example, an optical communication line). In this case, the signal transmission apparatus 1a is different from the signal transmission apparatus 1 in that it includes an E/O converter 13a that converts the transmission z, which is outputted from the power amplifier 12, to an optical signal. As a result, the transmission signal z that is converted to the optical signal is transmitted through a signal propagation path 14a (namely, a signal propagation path included in at least a part of the optical communication network) such as an optical fiber. A part or whole of the signal propagation path 14a may be a component included in the signal transmission apparatus Ta. Alternatively, the signal propagation path 14a may be a component that is different from the signal transmission apparatus Ta.

A signal reception apparatus 3a that receives the transmission signal z converts the transmission signal z that is the optical signal to an electric signal by using an O/E converter 31a, and then receives the transmission signal z that is converted to the electric signal by using a receiving unit 32a.

The distortion compensation circuit 11 may perform, on the input signal x, a distortion compensation for compensating a distortion that is generated due to the transmission of the transmission signal z on the signal propagation path 14a (namely, a distortion that is generated in the transmission signal z on the signal propagation path 14a), in addition to or instead of the distortion that is generated in the transmission signal z due to the operation of the power amplifier 12. As a result, even when the transmission signal z is transmitted through the optical communication network (for example, the optical communication line), the distortion of the transmission signal z is properly compensated. In this case, considering that the distortion is generated in the transmission signal z on the signal propagation path 14a, each of the sample signal and the label signal described above may be a signal based on a reception signal that is received by the signal reception apparatus 3a (namely, a signal that includes the distortion that is generated in the transmission signal z on the signal propagation path 14a), in addition to or instead of at least one of the input signal x, the distortion compensation signal y and the transmission signal z, for example.

Incidentally, when the transmission signal z that is converted to the optical signal is transmitted, the signal generating unit 111 may input, to the neural network 112, a X polarized wave component and a Y polarized wave component of the input signal $x_t$, instead of the above described various signals.

<4-2> Signal Transmission Apparatus 1b in Second Modified Example

Figure 13:
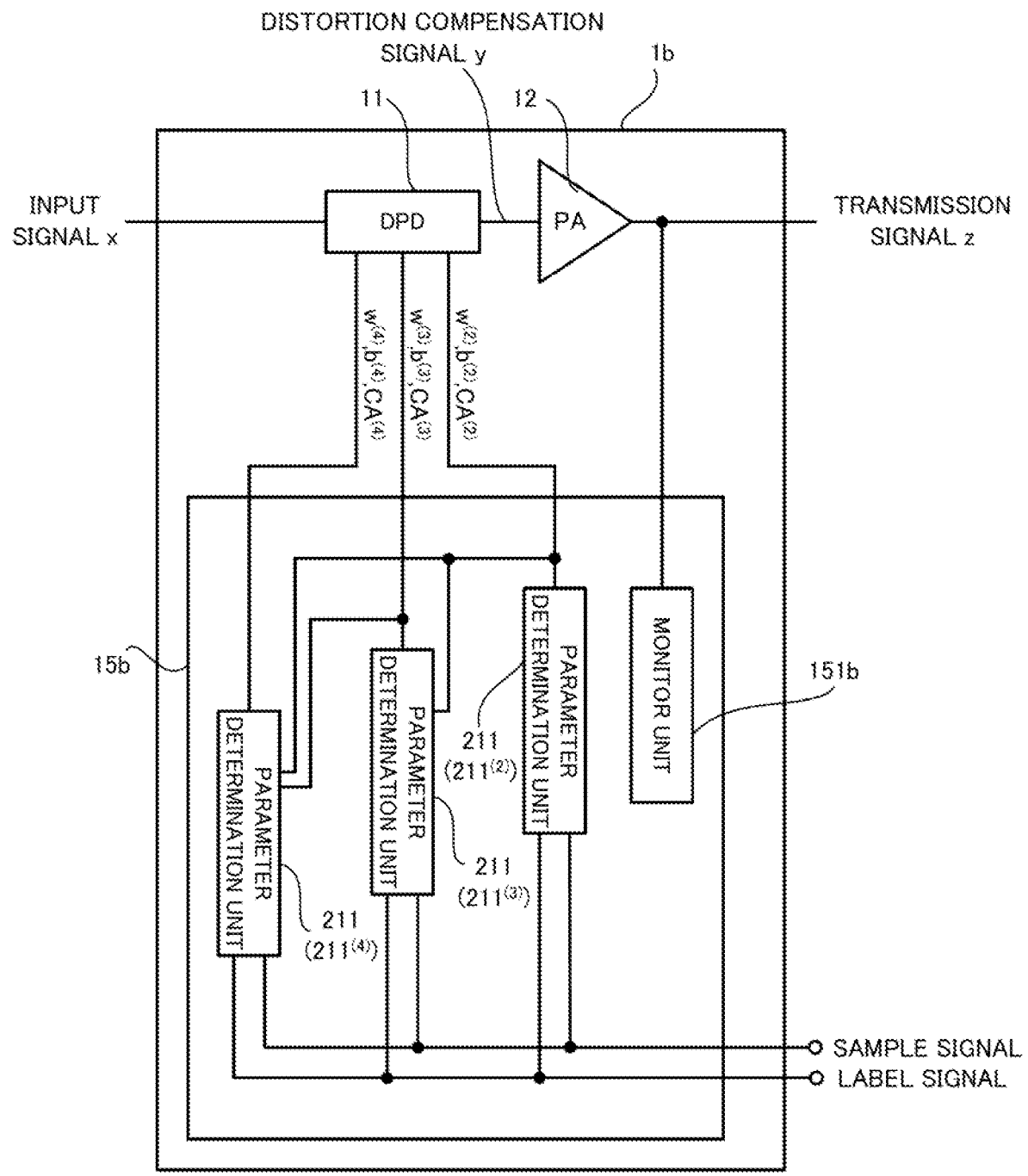
FIG. 13 is a block diagram that illustrates a configuration of a signal transmission apparatus in a second modified example.

Next, with reference to FIG. 13, a signal transmission apparatus 1b in a second modified example will be described. FIG. 13 is a block diagram that illustrates a configuration of the signal transmission apparatus 1b in the second modified example.

As illustrated in FIG. 13, the signal transmission apparatus 1b is different from the signal transmission apparatus 1 in that the function block for determining the parameters of the neural network 112 is implemented in the signal transmission apparatus 1b. Specifically, the signal transmission apparatus 1b includes a CPU 15b. The CPU 15b reads a computer program. The computer program read by the CPU 15b may be recorded in any recording medium, as with the computer program read by the CPU 21. The CPU 15b may execute the read computer program to control the distortion compensation circuit 11 and the power amplifier 12. Especially, when the CPU 15b executes the read computer program, the logical function block for determining the parameters of the neural network 112 is implemented in the CPU 15b. Specifically, as illustrated in FIG. 13, the function block that is same as the function block implemented in the CPU 21 is implemented in the CPU 15b. In this case, it can be said that the parameter determination apparatus 2 is implemented in the signal transmission apparatus 1b.

In this case, the signal transmission apparatus 1b itself is capable of updating the parameters of the neural network 112. Thus, the parameters of the neural network 112 can be updated after the signal transmission apparatus 1b is shipped. For example, the parameters of the neural network 112 may be updated (in other word, adjusted) on the basis of an actual usage condition of the signal transmission apparatus 1b when the signal transmission apparatus 1b is installed at an installation site. For example, the parameters of the neural network 112 may be updated on the basis of a characteristic of the transmission signal z that is actually transmitted by the signal transmission apparatus 1b after the signal transmission apparatus 1b starts to operate. For example, the parameters of the neural network 112 may be updated on the basis of a time degradation (namely, a drift) of the signal transmission apparatus 1b after the signal transmission apparatus 1b starts to operate. As a result, even after the signal transmission apparatus 1b is shipped, it is possible to keep a distortion compensation performance of the distortion compensation circuit 11 in a relatively high condition.

Moreover, the signal transmission apparatus 1b is capable of updating the parameters of the neural network 112 by using the sample signal and the label signal that are based on at least one of the input signal x that is actually inputted to the signal transmission apparatus 1b, the distortion compensation signal y that is actually generated by the signal transmission apparatus 1b and the output signal z that is actually transmitted by the signal transmission apparatus 1b. Thus, the signal transmission apparatus 1b is capable of updating the parameters of the neural network 112 depending on the actual usage condition of the signal transmission apparatus 1b.

Figure 14:
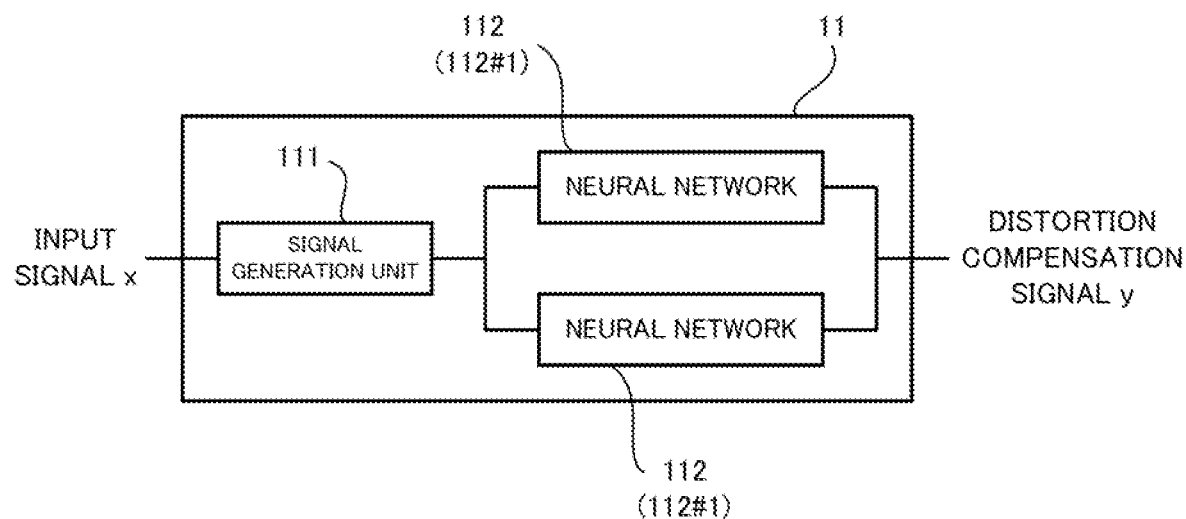
FIG. 14 is a block diagram that illustrates another example of a configuration of a distortion compensation circuit in the second modified example.

The parameters determined by the signal transmission apparatus 1b itself may be reflected in the neural network 112 at a desired timing. However, a period at which the signal transmission apparatus 1b cannot transmit the transmission signal z may possibly occur until the reflection of new parameters in the neural network 112. Thus, as illustrated in FIG. 14, the distortion compensation circuit 11 may adopt a redundant configuration in which it includes a plurality of neural network 112. FIG. 14 illustrates an example in which the distortion compensation circuit 11 includes two neural network 112#1 and 112#2. In this case, the parameters determined by the signal transmission apparatus 1b itself may be reflected in another neural network 112 when one neural network 112 performs the distortion compensation. Namely, the parameters of another neural network 112 (for example, the neural network 112#2) may be updated by the parameters determined by the signal transmission apparatus 1b itself when one neural network 112 (for example, the neural network 112#1) performs the distortion compensation. Then, a state of the distortion compensation circuit 11 may be switched from a state in which one neural network 112 performs the distortion compensation to a state in which another neural network 112 in which new parameters are reflected performs the distortion compensation. As a result, it is possible to reduce or eliminate the period at which the signal transmission apparatus 1b cannot transmit the transmission signal z.

A monitor unit 151b (see FIG. 13) for monitoring the transmission signal z that is actually transmitted by the signal transmission apparatus 1b may be implemented in the CPU 15b. In this case, the signal transmission apparatus 1b may determine on the basis of a monitored result by the monitor unit 151b whether or not to update the parameters of the neural network 112. For example, when a predetermined update start condition relating to a characteristic of the transmission signal z monitored by the monitor unit 151b is satisfied, the signal transmission apparatus 1b may determine to update the parameters of the neural network 112. On the other hand, when the predetermined update start condition relating to a characteristic of the transmission signal z monitored by the monitor unit 151b is not satisfied, the signal transmission apparatus 1b may determine not to update the parameters of the neural network 112. A condition that the distortion of the transmission signal z is equal to or larger than an allowable value is one example of the update start condition.

Figure 15:
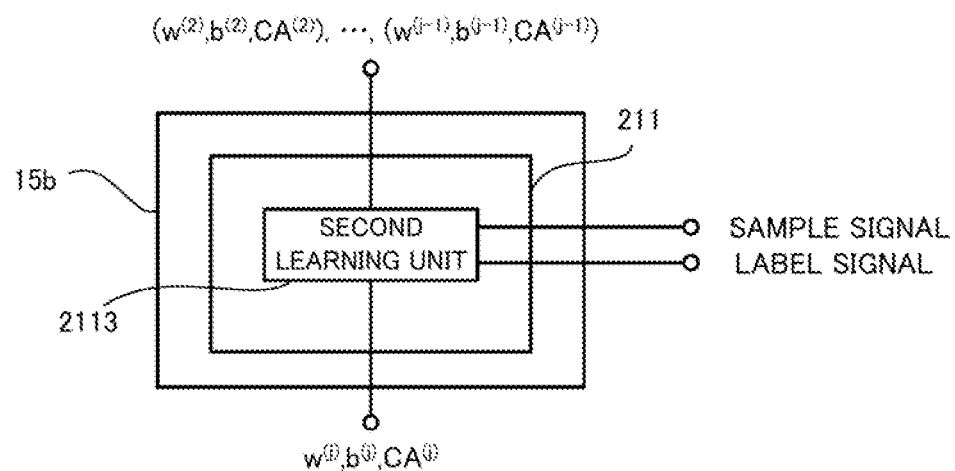
FIG. 15 is a block diagram that illustrates another example of a functional block for updating a parameter of a neural network implemented in the signal transmission apparatus in the second modified example.
Figure 16:
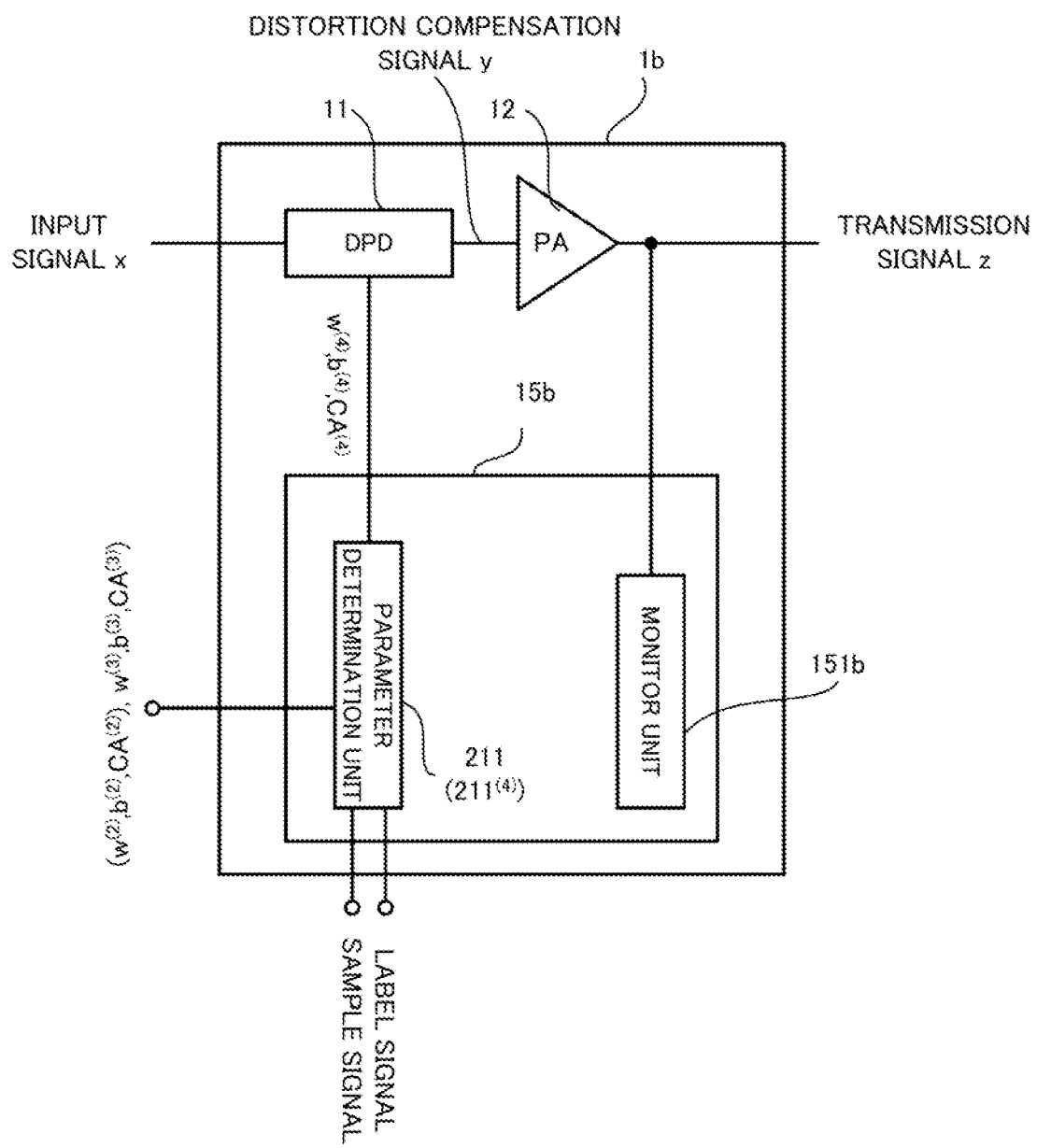
FIG. 16 is a block diagram that illustrates another example of a functional block for updating a parameter of a neural network implemented in the signal transmission apparatus in the second modified example.

Note that all of the functional blocks implemented in the CPU 21 of the parameter determination apparatus 2 is implemented in the signal transmission apparatus 2b in the above described description. However, a part of the functional blocks implemented in the CPU 21 of the parameter determination apparatus 2 may be implemented in the signal transmission apparatus 2b and another part of the functional blocks implemented in the CPU 21 of the parameter determination apparatus 2 may not be implemented in the signal transmission apparatus 2b. As a result, the signal transmission apparatus 1b can update the parameters to some extent even when a processing speed of the CPU 15b of the signal transmission apparatus 1b is not so fast. Namely, a function for updating the parameters can be implemented in the signal transmission apparatus 1b that includes the CPU 15b (alternatively, any arithmetic apparatus) the processing speed is not so fast. As one example, for example, as illustrated in FIG. 15, a functional block corresponding to the second learning unit 2113 may be implemented but functional blocks corresponding to the first learning unit 2211 and the connection path selection unit 2212 may not be implemented in the signal transmission apparatus 1b. For example, a functional block for updating the parameters of a part of the network structures NS that is relatively close to the output layer 112O may be implemented but a functional block for updating the parameters of another part of the network structures NS that is relatively far from the output layer 112O may not be implemented in the signal transmission apparatus 1b. As one example, a functional block for updating the parameters of the network structure $NS^{(4)}$ between the output layer 112O and the second hidden layer $112M^{(3)}$ may be implemented but a functional block for updating the parameters of the network structure $NS^{(3)}$ and the network structure $NS^{(2)}$ between the second hidden layer $112M^{(3)}$ and the input layer 112I may not be implemented in the signal transmission apparatus 1b. Namely, as illustrated in FIG. 16, a functional block corresponding to the parameter determination unit(4) may be implemented but functional blocks corresponding to the parameter determination unit$^{(3)}$ and corresponding to the parameter determination unit$^{(2)}$ may not be implemented in the signal transmission apparatus 1b. In any cases, a processing load necessary for updating the parameters is reduced, compared to a case where all of the functional blocks implemented in the CPU 21 of the parameter determination apparatus 2 is implemented in the signal transmission apparatus 2b.

<5> Supplementary Note

With respect to the example embodiments described above, the following Supplementary Notes will be further disclosed.

[5-1] Supplementary Note 1

A parameter determination apparatus that determines parameters of a neural network including a plurality of layers, the parameter determination apparatus including:

a first learning device that learns a weight between a [j−1]-th layer (note that j is an integer that satisfies such a condition that "2≤j≤the number of the layer") and a [j]-th layer to which an output of the [j−1]-th layer is inputted among the plurality of layers on the basis of a sample signal and a label signal;

a selecting device that selects, as a part of the parameters, at least one valid path that is used as a valid connection path in the neural network for each node included in the [j]-th layer from a plurality of connection paths that connect a plurality of nodes included in the [j−1]-th layer and a plurality of nodes included in the [j]-th layer, respectively, on the basis of the weight learned by the first learning device; and a second learning device that learns, as a part of the parameters, at least one of the weight between the [j−1]-th layer and the [j]-th layer and a bias added in the [j]-th layer on the basis of the sample signal, the label signal and the valid path.

[5-2] Supplementary Note 2

The parameter determination apparatus according to Supplementary Note 1, wherein when the variable number j is an integer that is equal to or lager than 3, the second learning device learns at least one of the weight between the [j−1]-th layer and the [j]-th layer and the bias added in the [j]-th layer on the basis of the sample signal, the label signal, the valid path and the parameter relating to a network structure between a first layer and the [j−1]-th layer among the plurality of layers.

[5-3] Supplementary Note 3

The parameter determination apparatus according to Supplementary Note 1 or 2, wherein when the variable number j is an integer that is equal to or lager than 3, the second learning device learns at least one of the weight between the [j−1]-th layer and the [j]-th layer and the bias added in the [j]-th layer while fixing the parameter relating to a network structure between a first layer and the [j−1]-th layer among the plurality of layers so as to reduce a difference between the label signal and an output from the neural network to which the sample signal is inputted.

[5-4] Supplementary Note 4

The parameter determination apparatus according to any one of Supplementary Notes 1 to 3 including a plurality of parameter determination units each of which includes the first learning device, the selecting device and the second learning device, each of the plurality of parameter determination units determines the parameters relating to respective one of the plurality of different layers.

[5-5] Supplementary Note 5

The parameter determination apparatus according to any one of Supplementary Notes 1 to 4, wherein every time the weight between the [j−1]-th layer and the [j]-th layer is learned, the first learning device (i) selects, as a limited path, a part of the plurality of connection paths that connect the plurality of nodes included in the [j−1]-th layer and the plurality of nodes included in the [j]-th layer, respectively, on the basis of the learned weight, and (ii) updates an objective function that is used to learn the weight between the [j−1]-th layer and the [j]-th layer so that a learning is expected to be performed to allow a weight corresponding to the limited path to be relatively larger than a weight corresponding to a connection path of the plurality of connection paths other than the limited path, and learns the weight between the [j−1]-th layer and the [j]-th layer again by using the updated objective function.

[5-6] Supplementary Note 6

The parameter determination apparatus according to Supplementary Note 5, wherein the objective function is a function in which an learning error and a regularization term that becomes larger as a total sum of an absolute value of the weight between the [j−1]-th layer and the [j]-th layer becomes larger are added, the first learning device updates the objective function so as to reduce a regularization term component of the regularization term that becomes larger as a total sum of an absolute value of the weight corresponding to the limited path or an exponentiation of the absolute value becomes larger.

[5-7] Supplementary Note 7

The parameter determination apparatus according to Supplementary Note 6, wherein the first learning device updates the objective function so as to reduce the regularization term component by multiplying the regularization term component by a coefficient that is equal to or larger than 0 and that is equal to or smaller than 1, when the objective function is newly updated, the first learning device updates the objective function by multiplying the regularization term component by the coefficient that is equal to or smaller than the coefficient that is used to previously update the objective function.

[5-8] Supplementary Note 8

The parameter determination apparatus according to any one of Supplementary Notes 1 to 7, wherein when a learning error is smaller than a target value after a learning of at least one of the weight between the [j−1]-th layer and the [j]-th layer and the bias added in the [j]-th layer is completed, the second learning device deletes one valid path an absolute value of a weight of which is minimum and learns at least one of the weight between the [j−1]-th layer and the [j]-th layer and the bias added in the [j]-th layer again.

[5-9] Supplementary Note 9

The parameter determination apparatus according to any one of Supplementary Notes 1 to 8, wherein when a learning error is smaller than a target value after a learning of at least one of the weight between the [j−1]-th layer and the [j]-th layer and the bias added in the [j]-th layer is completed, the second learning device deletes one node a linear independency of an output vector of which is the lowest among a plurality of nodes included in the [j]-th layer and learns at least one of the weight between the [j−1]-th layer and the [j]-th layer and the bias added in the [j]-th layer again.

[5-10] Supplementary Note 10

The parameter determination apparatus according to any one of Supplementary Notes 1 to 9, wherein the parameter determination apparatus determines the parameters of a neural network that is implemented in a signal transmission apparatus that transmits a transmission signal to a signal reception apparatus as the neural network.

[5-11] Supplementary Note 11

The parameter determination apparatus according to Supplementary Note 10, wherein at least one of the sample signal and the label signal is a signal based on at least one of the transmission signal and a reception signal that is received by the signal reception apparatus.

[5-12] Supplementary Note 12

The parameter determination apparatus according to Supplementary Note 11, wherein the signal transmission apparatus includes:

a distortion compensating device that generates a distortion compensation signal by performing a distortion compensation on an input signal; and a signal generating device that generates the transmission signal by performing a predetermined operation on the distortion compensation signal, the parameter determination apparatus determines the parameters of a neural network that is implemented in the distortion compensating device as the neural network.

[5-13] Supplementary Note 13

The parameter determination apparatus according to Supplementary Note 12, wherein at least one of the sample signal and the label signal is a signal based on at least one of the input signal, the distortion compensation signal, the transmission signal and a reception signal that is received by the signal reception apparatus.

[5-14] Supplementary Note 14

A signal transmission apparatus including:

a distortion compensating device that generates a distortion compensation signal by performing a distortion compensation on an input signal by using the neural network that is defined by parameters determined by a parameter determination apparatus; and a signal generating device that generates a transmission signal that is transmitted to a signal reception apparatus by performing a predetermined operation on the distortion compensation signal, the parameter determination apparatus including:

a first learning device that learns a weight between a [j−1]-th layer (note that j is an integer that satisfies such a condition that "2≤j≤the number of the layer") and a [j]-th layer to which an output of the [j−1]-th layer is inputted among the plurality of layers on the basis of a sample signal and a label signal;

a selecting device that selects, as a part of the parameters, at least one valid path that is used as a valid connection path in the neural network for each node included in the [j]-th layer from a plurality of connection paths that connect a plurality of nodes included in the [j−1]-th layer and a plurality of nodes included in the [j]-th layer, respectively, on the basis of the weight learned by the first learning device; and a second learning device that learns, as a part of the parameters, at least one of the weight between the [j−1]-th layer and the [j]-th layer and a bias added in the [j]-th layer on the basis of the sample signal, the label signal and the valid path.

[5-15] Supplementary Note 15

The signal transmission apparatus according to Supplementary Note 14 further including:

a learning device that learns, as a part of the parameters, at least one of the weight between the [j−1]-th layer and the [j]-th layer and the bias added in the [j]-th layer on the basis of the sample signal and the label signal.

[5-16] Supplementary Note 16

A signal transmission apparatus including:

a distortion compensating device that generates a distortion compensation signal by performing a distortion compensation on an input signal by using a neural network;

a signal generating device that generates a transmission signal that is transmitted to a signal reception apparatus by performing a predetermined operation on the distortion compensation signal; and a learning device that learns, as a part of parameters of the neural network, at least one of a weight between a [j−1]-th layer (note that j is an integer that satisfies such a condition that "2≤j≤the number of the layer") and a [j]-th layer to which an output of the [j−1]-th layer is inputted among a plurality of layers of the neural network and a bias added in the [j]-th layer on the basis of a sample signal and a label signal.

[5-17] Supplementary Note 17

The signal transmission apparatus according to Supplementary Note 15 or 16, wherein the distortion compensating device performs the distortion compensation by using one neural network of a plurality of redundant neural networks, the distortion compensating device applies the parameters learned by the learning device to another neural network of the plurality of neural networks that is different from one neural network, and then performs the distortion compensation by using another neural network instead of one neural network.

[5-18] Supplementary Note 18

The signal transmission apparatus according to any one of Supplementary Notes 15 to 17, wherein the learning device learns at least one of the weight between the [j−1]-th layer and the [j]-th layer and the bias added in the [j]-th layer when a predetermined learning start condition is satisfied.

[5-19] Supplementary Note 19

The signal transmission apparatus according to any one of Supplementary Notes 15 to 18, wherein the learning device provisionally learns the weight between the [j−1]-th layer and the [j]-th layer on the basis of the sample signal and the label signal, selects, as a part of the parameters, at least one valid path that is used as a valid connection path in the neural network for each node included in the [j]-th layer from a plurality of connection paths that connect a plurality of nodes included in the [j−1]-th layer and a plurality of nodes included in the [j]-th layer, respectively, on the basis of the provisionally learned weight, and learns at least one of the weight between the [j−1]-th layer and the [j]-th layer and the bias added in the [j]-th layer on the basis of the sample signal, the label signal and the valid path.

[5-20] Supplementary Note 20

The signal transmission apparatus according to Supplementary Note 19, wherein the learning device provisionally learns the weight between the [j−1]-th layer and the [j]-th layer and selects the valid path on the basis of the provisionally learned weight when a predetermined learning start condition is satisfied.

[5-21] Supplementary Note 21

The signal transmission apparatus according to Supplementary Note 18 or 20 including a monitoring device that monitors the transmission signal, the learning start condition includes a condition that is set on the basis of a characteristic of the transmission signal.

[5-22] Supplementary Note 22

The signal transmission apparatus according to Supplementary Note 22, wherein the learning start condition includes such a condition that a distortion of the transmission signal monitored by the monitoring device is equal to or larger than an allowable value.

[5-23] Supplementary Note 23

The signal transmission apparatus according to any one of Supplementary Notes 14 to 22, wherein at least one of the sample signal and the label signal is a signal based on at least one of the input signal, the distortion compensation signal, the transmission signal and a reception signal that is received by the signal reception apparatus.

[5-24] Supplementary Note 24

The signal transmission apparatus according to any one of Supplementary Notes 14 to 23, wherein the distortion compensation compensates at least one of a distortion generated in the transmission signal due to the predetermined operation and a distortion generated in the transmission signal on a signal transmission path from the signal generating device to the signal reception apparatus.

[5-25] Supplementary Note 25

25. The signal transmission apparatus according to Supplementary Note 24, wherein the signal transmission apparatus includes at least a part of the signal transmission path.

[5-26] Supplementary Note 26

A parameter determination method that determines parameters of a neural network including a plurality of layers, the parameter determination method including:

learning a weight between a [j−1]-th layer (note that j is an integer that satisfies such a condition that "2≤j≤the number of the layer") and a [j]-th layer to which an output of the [j−1]-th layer is inputted among the plurality of layers on the basis of a sample signal and a label signal;

selecting, as a part of the parameters, at least one valid path that is used as a valid connection path in the neural network for each node included in the [j]-th layer from a plurality of connection paths that connect a plurality of nodes included in the [j−1]-th layer and a plurality of nodes included in the [j]-th layer, respectively, on the basis of the weight learned by the first learning device; and learning, as a part of the parameters, at least one of the weight between the [j−1]-th layer and the [j]-th layer and a bias added in the [j]-th layer on the basis of the sample signal, the label signal and the valid path.

[5-27] Supplementary Note 27

A signal transmission method including:

generating a distortion compensation signal by performing a distortion compensation on an input signal by using the neural network that is defined by parameters determined by a parameter determination apparatus; and generating a transmission signal that is transmitted to a signal reception apparatus by performing a predetermined operation on the distortion compensation signal, the parameter determination apparatus including:

a first learning device that learns a weight between a [j−1]-th layer (note that j is an integer that satisfies such a condition that "2≤j≤the number of the layer") and a [j]-th layer to which an output of the [j−1]-th layer is inputted among the plurality of layers on the basis of a sample signal and a label signal;

a selecting device that selects, as a part of the parameters, at least one valid path that is used as a valid connection path in the neural network at least one for each node included in the [j]-th layer from a plurality of connection paths that connect a plurality of nodes included in the [j−1]-th layer and a plurality of nodes included in the [j]-th layer, respectively, on the basis of the weight learned by the first learning device; and a second learning device that learns, as a part of the parameters, at least one of the weight between the [j−1]-th layer and the [j]-th layer and a bias added in the [j]-th layer on the basis of the sample signal, the label signal and the valid path.

[5-28] Supplementary Note 28

A signal transmission method including:

generating a distortion compensation signal by performing a distortion compensation on an input signal by using a neural network;

generating a transmission signal that is transmitted to a signal reception apparatus by performing a predetermined operation on the distortion compensation signal; and learning, as a part of parameters of the neural network, at least one of a weight between a [j−1]-th layer (note that j is an integer that satisfies such a condition that "2≤j≤the number of the layer") and a [j]-th layer to which an output of the [j−1]-th layer is inputted among a plurality of layers of the neural network and a bias added in the [j]-th layer on the basis of a sample signal and a label signal.

[5-29] Supplementary Note 29

A computer program that allows a computer to execute a parameter determination method that determines parameters of a neural network including a plurality of layers, the parameter determination method including:

learning a weight between a [j−1]-th layer (note that j is an integer that satisfies such a condition that "2≤j≤the number of the layer") and a [j]-th layer to which an output of the [j−1]-th layer is inputted among the plurality of layers on the basis of a sample signal and a label signal;

selecting, as a part of the parameters, at least one valid path that is used as a valid connection path in the neural network for each node included in the [j]-th layer from a plurality of connection paths that connect a plurality of nodes included in the [j−1]-th layer and a plurality of nodes included in the [j]-th layer, respectively, on the basis of the weight learned by the first learning device; and learning, as a part of the parameters, at least one of the weight between the [j−1]-th layer and the [j]-th layer and a bias added in the [j]-th layer on the basis of the sample signal, the label signal and the valid path.

[5-30] Supplementary Note 30

A computer program that allows a computer to execute a signal transmission method, the signal transmission method including:

generating a distortion compensation signal by performing a distortion compensation on an input signal by using the neural network that is defined by parameters determined by a parameter determination apparatus; and generating a transmission signal that is transmitted to a signal reception apparatus by performing a predetermined operation on the distortion compensation signal, the parameter determination apparatus including:

a first learning device that learns a weight between a [j−1]-th layer (note that j is an integer that satisfies such a condition that "$2 \leq j \leq$ the number of the layer") and a [j]-th layer to which an output of the [j−1]-th layer is inputted among the plurality of layers on the basis of a sample signal and a label signal;

a selecting device that selects, as a part of the parameters, at least one valid path that is used as a valid connection path in the neural network for each node included in the [j]-th layer from a plurality of connection paths that connect a plurality of nodes included in the [j−1]-th layer and a plurality of nodes included in the [j]-th layer, respectively, on the basis of the weight learned by the first learning device; and a second learning device that learns, as a part of the parameters, at least one of the weight between the [j−1]-th layer and the [j]-th layer and a bias added in the [j]-th layer on the basis of the sample signal, the label signal and the valid path.

[5-31] Supplementary Note 31

A computer program that allows a computer to execute a signal transmission method, the signal transmission method including:

generating a distortion compensation signal by performing a distortion compensation on an input signal by using a neural network;

generating a transmission signal that is transmitted to a signal reception apparatus by performing a predetermined operation on the distortion compensation signal; and learning, as a part of parameters of the neural network, at least one of a weight between a [j−1]-th layer (note that j is an integer that satisfies such a condition that "$2 \leq j \leq$ the number of the layer") and a [j]-th layer to which an output of the [j−1]-th layer is inputted among a plurality of layers of the neural network and a bias added in the [j]-th layer on the basis of a sample signal and a label signal.

[5-32] Supplementary Note 32

A recording medium on which a computer program allowing a computer to execute a parameter determination method that determines parameters of a neural network including a plurality of layers is recorded, the parameter determination method including:

learning a weight between a [j−1]-th layer (note that j is an integer that satisfies such a condition that "$2 \leq j \leq$ the number of the layer") and a [j]-th layer to which an output of the [j−1]-th layer is inputted among the plurality of layers on the basis of a sample signal and a label signal;

selecting, as a part of the parameters, at least one valid path that is used as a valid connection path in the neural network for each node included in the [j]-th layer from a plurality of connection paths that connect a plurality of nodes included in the [j−1]-th layer and a plurality of nodes included in the [j]-th layer, respectively, on the basis of the weight learned by the first learning device; and learning, as a part of the parameters, at least one of the weight between the [j−1]-th layer and the [j]-th layer and a bias added in the [j]-th layer on the basis of the sample signal, the label signal and the valid path.

[5-33] Supplementary Note 33

A recording medium on which a computer program allowing a computer to execute a signal transmission method is recorded, the signal transmission method including:

generating a distortion compensation signal by performing a distortion compensation on an input signal by using the neural network that is defined by parameters determined by a parameter determination apparatus; and generating a transmission signal that is transmitted to a signal reception apparatus by performing a predetermined operation on the distortion compensation signal, the parameter determination apparatus including:

a first learning device that learns a weight between a [j−1]-th layer (note that j is an integer that satisfies such a condition that "$2 \leq j \leq$ the number of the layer") and a [j]-th layer to which an output of the [j−1]-th layer is inputted among the plurality of layers on the basis of a sample signal and a label signal;

a selecting device that selects, as a part of the parameters, at least one valid path that is used as a valid connection path in the neural network for each node included in the [j]-th layer from a plurality of connection paths that connect a plurality of nodes included in the [j−1]-th layer and a plurality of nodes included in the [j]-th layer, respectively, on the basis of the weight learned by the first learning device; and a second learning device that learns, as a part of the parameters, at least one of the weight between the [j−1]-th layer and the [j]-th layer and a bias added in the [j]-th layer on the basis of the sample signal, the label signal and the valid path.

[5-34] Supplementary Note 34

A recording medium on which a computer program allowing a computer to execute a signal transmission method is recorded, the signal transmission method including:

generating a distortion compensation signal by performing a distortion compensation on an input signal by using a neural network;

generating a transmission signal that is transmitted to a signal reception apparatus by performing a predetermined operation on the distortion compensation signal; and learning, as a part of parameters of the neural network, at least one of a weight between a [j−1]-th layer (note that j is an integer that satisfies such a condition that "$2 \leq j \leq$ the number of the layer") and a [j]-th layer to which an output of the [j−1]-th layer is inputted among a plurality of layers of the neural network and a bias added in the [j]-th layer on the basis of a sample signal and a label signal.

The present invention is allowed to be changed, if desired, without departing from the essence or spirit of the invention which can be read from the claims and the entire specification, and a parameter determination apparatus, a parameter determination method, a signal transmission apparatus, a signal transmission method, a computer program and a recording medium, which involve such changes, are also intended to be within the technical scope of the present invention.

This application is based upon and claims the benefit of priority from Japanese Patent Application No. 2019-169715, filed on Sep. 18, 2019, and incorporates all of its disclosure herein, if legally permitted. Moreover, this application incorporates all of the publications of application and articles, if legally permitted.

DESCRIPTION OF REFERENCE CODES 1 signal transmission apparatus
11 distortion compensation circuit
112 neural network
2 parameter determination apparatus
21 CPU
211 parameter determination unit
2111 first learning unit
2112 connection path selection unit
2113 second learning unit

What is claimed is:

1. A parameter determination apparatus that determines parameters of a neural network including a plurality of layers that each include a plurality of nodes,
the parameter determination apparatus comprising a controller one or more processors and a memory storing program code executable by the one or more processors to:
provisionally learn a weight between a [j−1]-th layer, where (j is an integer that satisfies a condition that 2≤j≤a number of the layers and a [j]-th layer to which an output of the [j−1]-th layer is inputted among the plurality of layers based on a sample signal and a label signal;
select, as a part of the parameters, at least one valid path that is used as a valid connection path in the neural network for each node included in the [j]-th layer from a plurality of connection paths that connect the plurality of nodes included in the [j−1]-th layer and the plurality of nodes included in the [j]-th layer, respectively, based on the provisionally learned weight; and
learn, as a part of the parameters, at least one of a weight between the [j−1]-th layer and the [j]-th layer and a bias added in the [j]-th layer based on the sample signal, the label signal, and the at least one valid path.

2. The parameter determination apparatus according to claim 1, wherein
when j is an integer that is equal to or larger than 3, at least one of the weight between the [j−1]-th layer and the [j]-th layer, the bias added in the [j]-th layer on the sample signal, the label signal, the at least one valid path, and the parameter relating to a network structure between a first layer and the [j−1]-th layer among the plurality of layers is learned.

3. The parameter determination apparatus according to claim 1, wherein
when j is an integer that is equal to or larger than 3, at least one of the weight between the [j−1]-th layer and the [j]-th layer and the bias added in the [j]-th layer is learned while fixing the parameter relating to a network structure between a first layer and the [j−1]-th layer among the plurality of layers so as to reduce a difference between the label signal and an output from the neural network to which the sample signal is inputted.

4. The parameter determination apparatus according to claim 1, wherein the program code is executable by the one or more processors to further:
every time the weight between the [j−1]-th layer and the [j]-th layer is learned, (i) select, as a limited path, a part of the plurality of connection paths that connect the plurality of nodes included in the [j−1]-th layer and the plurality of nodes included in the [j]-th layer, respectively, based on the learned weight, and (ii) update an objective function that is used to learn the weight between the [j−1]-th layer and the [j]-th layer so that learning is expected to be performed to allow a weight corresponding to the limited path to be relatively larger than a weight corresponding to a connection path of the plurality of connection paths other than the limited path, and learn the weight between the [j−1]-th layer and the [j]-th layer again by using the updated objective function.

5. The parameter determination apparatus according to claim 4, wherein
the objective function is a function in which an learning error and a regularization term that becomes larger as a total sum of an absolute value of the weight between the [j−1]-th layer and the [j]-th layer becomes larger are added, and
the objective function is updated so as to reduce a regularization term component of the regularization term that becomes larger as the total sum of the absolute value of the weight corresponding to the limited path or an exponentiation of the absolute value becomes larger.

6. The parameter determination apparatus according to claim 5, wherein
the objective function is updated so as to reduce the regularization term component by multiplying the regularization term component by a coefficient that is equal to or larger than 0 and that is equal to or smaller than 1,
when the objective function is newly updated, the objective function is updated by multiplying the regularization term component by the coefficient that is equal to or smaller than the coefficient that was used to previously update the objective function.

7. The parameter determination apparatus according to claim 1, wherein the program code is executable by the one or more processors to further:
when a learning error is smaller than a target value after learning of at least one of the weight between the [j−1]-th layer and the [j]-th layer and the bias added in the [j]-th layer is completed, delete one valid path that an absolute value of a weight of which is minimum and learn at least one of the weight between the [j−1]-th layer and the [j]-th layer and the bias added in the [j]-th layer again.

8. The parameter determination apparatus according to claim 1, wherein the program code is executable by the one or more processors to further:
when a learning error is smaller than a target value after a learning of at least one of the weight between the [j−1]-th layer and the [j]-th layer and the bias added in the [j]-th layer is completed, delete one node that a linear independency of an output vector of which is lowest among a plurality of nodes included in the [j]-th layer and learn at least one of the weight between the [j−1]-th layer and the [j]-th layer and the bias added in the [j]-th layer again.

9. The parameter determination apparatus according to claim 1, wherein
the parameter determination apparatus determines the parameters of a neural network that is implemented in a signal transmission apparatus that transmits a transmission signal to a signal reception apparatus as the neural network.

10. The parameter determination apparatus according to claim 9, wherein
at least one of the sample signal and the label signal is based on at least one of the transmission signal and a reception signal that is received by the signal reception apparatus.

11. The parameter determination apparatus according to claim 10, wherein
the signal transmission apparatus:
generates a distortion compensation signal by performing a distortion compensation on an input signal; and
generates the transmission signal by performing a predetermined operation on the distortion compensation signal, and
the parameter determination apparatus determines the parameters of a neural network that is implemented in the distortion compensator as the neural network.

12. The parameter determination apparatus according to claim 11, wherein
at least one of the sample signal and the label signal is based on at least one of the input signal, the distortion compensation signal, the transmission signal, and the reception signal that is received by the signal reception apparatus.

13. A signal transmission apparatus comprising:
one or more processors; and
a memory storing program code executable by the one or more processors to:
generate a distortion compensation signal by performing a distortion compensation on an input signal by using a neural network that is defined by parameters determined by a parameter determination apparatus and that includes a plurality of layers that each include a plurality of nodes; and
generate a transmission signal that is transmitted to a signal reception apparatus by performing a predetermined operation on the distortion compensation signal,
the parameter determination apparatus configured to:
provisionally learn a weight between a [j−1]-th layer, where (j is an integer that satisfies a condition that 2≤j≤a number of the layers and a [j]-th layer to which an output of the [j−1]-th layer is inputted among the plurality of layers based on a sample signal and a label signal;
select, as a part of the parameters, at least one valid path that is used as a valid connection path in the neural network for each node included in the [j]-th layer from a plurality of connection paths that connect the plurality of nodes included in the [j−1]-th layer and the plurality of nodes included in the [j]-th layer, respectively, based on the provisionally learned weight; and
learn, as a part of the parameters, at least one of a weight between the [j−1]-th layer and the [j]-th layer and a bias added in the [j]-th layer based on the sample signal, the label signal, and the at least one valid path.

14. The signal transmission apparatus according to claim 13, wherein the parameter determination apparatus is configured to further learn, as a part of the parameters, at least one of the weight between the [j−1]-th layer and the [j]-th layer and the bias added in the [j]-th layer based on the sample signal and the label signal.

15. A signal transmission apparatus comprising:
one or more processors; and
a memory storing program code executable by the one or more processors to:
generate a distortion compensation signal by performing a distortion compensation on an input signal by using a neural network having a plurality of layers that each include a plurality of nodes;
generate a transmission signal that is transmitted to a signal reception apparatus by performing a predetermined operation on the distortion compensation signal;
provisionally learn a weight between a [j−1]-th layer, where j is an integer that satisfies a condition that 2≤j≤a number of the layers and a [j]-th layer to which an output of the [j−1]-th layer is inputted among the plurality of layers based on a sample signal and a label signal;
select, as a part of parameters, at least one valid path that is used as a valid connection path in the neural network for each node included in the [j]-th layer from a plurality of connection paths that connect the plurality of nodes included in the [j−1]-th layer and the plurality of nodes included in the [j]-th layer, respectively, based on the provisionally learned weight; and
learn, as a part of the parameters, at least one of a weight between the [j−1]-th layer and the [j]-th layer and a bias added in the [j]-th layer based on the sample signal, the label signal, and the at least one valid path.

16. The signal transmission apparatus according to claim 15, wherein
the distortion compensation is performed by using one neural network of a plurality of redundant neural networks,
the learned parameters are applied to another neural network of the plurality of neural networks that is different from one neural network, and then the distortion compensation is performed by using another one neural network instead of the one neural network.

17. The signal transmission apparatus according to claim 15, wherein
least one of the weight between the [j−1]-th layer and the [j]-th layer and the bias added in the [j]-th layer is learned when a predetermined learning start condition is satisfied.

18. The signal transmission apparatus according to claim 15, wherein
the weight between the [j−1]-th layer and the [j]-th layer is provisionally learned and the valid path is provisionally selected based on the provisionally learned weight when a predetermined learning start condition is satisfied.

19. The signal transmission apparatus according to claim 17, wherein
the program code is executable by the one or more processors to further monitor the transmission signal, and
the predetermined learning start condition includes a condition that is set based on a characteristic of the transmission signal.

20. The signal transmission apparatus according to claim 19, wherein
the predetermined learning start condition includes such a condition that a distortion of the monitored transmission signal is equal to or larger than an allowable value.

21. The signal transmission apparatus according to claim 13, wherein
at least one of the sample signal and the label signal is based on at least one of the input signal, the distortion compensation signal, the transmission signal, and a reception signal that is received by the signal reception apparatus.

22. The signal transmission apparatus according to claim 13, wherein
at least one of a distortion generated in the transmission signal due to the predetermined operation and a distortion generated in the transmission signal on a signal transmission path from the signal transmission apparatus to the signal reception apparatus is compensated.

23. The signal transmission apparatus according to claim 22, wherein
the signal transmission apparatus includes at least a part of the signal transmission path.

24. A parameter determination method that determines parameters of a neural network including a plurality of layers that each include a plurality of nodes,
the parameter determination method comprising:
provisionally learning, by a processor, a weight between a [j−1]-th layer, where (j is an integer that satisfies a condition that 2≤j≤a number of the layers and a [j]-th layer to which an output of the [j−1]-th layer is inputted among the plurality of layers based on a sample signal and a label signal;
selecting, by the processor, as a part of the parameters, at least one valid path that is used as a valid connection path in the neural network for each node included in the [j]-th layer from a plurality of connection paths that connect the plurality of nodes included in the [j−1]-th layer and the plurality of nodes included in the [j]-th layer, respectively, based on the provisionally learned weight; and
learning, by the processor, as a part of the parameters, at least one of a weight between the [j−1]-th layer and the [j]-th layer and a bias added in the [j]-th layer based on the sample signal, the label signal, and the at least one valid path.

25. A signal transmission method comprising:
generating, by a processor, a distortion compensation signal by performing a distortion compensation on an input signal by using a neural network that is defined by parameters determined by a parameter determination apparatus and that includes a plurality of layers that each include a plurality of nodes; and
generating, by the processor, a transmission signal that is transmitted to a signal reception apparatus by performing a predetermined operation on the distortion compensation signal,
the parameter determination apparatus is configured to:
provisionally learn a weight between a [j−1]-th layer, where (j is an integer that satisfies a condition that 2≤j≤a number of the layers and a [j]-th layer to which an output of the [j−1]-th layer is inputted among the plurality of layers based on a sample signal and a label signal;
select, as a part of the parameters, at least one valid path that is used as a valid connection path in the neural network for each node included in the [j]-th layer from a plurality of connection paths that connect the plurality of nodes included in the [j−1]-th layer and the plurality of nodes included in the [j]-th layer, respectively, based on the provisionally learned weight; and
learn, as a part of the parameters, at least one of a weight between the [j−1]-th layer and the [j]-th layer and a bias added in the [j]-th layer based on the sample signal, the label signal, and the at least one valid path.

26. A signal transmission method comprising:
generating, by a processor, a distortion compensation signal by performing a distortion compensation on an input signal by using a neural network having a plurality of layers that each include a plurality of nodes;
generating, by the processor, a transmission signal that is transmitted to a signal reception apparatus by performing a predetermined operation on the distortion compensation signal;
provisionally learning, by the processor, a weight between a [j−1]-th layer, where j is an integer that satisfies a condition that 2≤j≤a number of the layers and a [j]-th layer to which an output of the [j−1]-th layer is inputted among the plurality of layers based on a sample signal and a label signal;
selecting, by the processor, as a part of parameters, at least one valid path that is used as a valid connection path in the neural network for each node included in the [j]-th layer from a plurality of connection paths that connect the plurality of nodes included in the [j−1]-th layer and the plurality of nodes included in the [j]-th layer, respectively, based on the provisionally learned weight; and
learning, by the processor, as a part of the parameters, at least one of a weight between the [j−1]-th layer and the [j]-th layer and a bias added in the [j]-th layer based on the sample signal, the label signal, and the at least one valid path.

27. A non-transitory recording medium on which a computer program executable by a computer to performing a parameter determination method that determines parameters of a neural network including a plurality of layers that each include a plurality of nodes is recorded,
the parameter determination method including:
provisionally learning a weight between a [j−1]-th layer, where (j is an integer that satisfies a condition that 2≤j≤a number of the layers and a [j]-th layer to which an output of the [j−1]-th layer is inputted among the plurality of layers based on a sample signal and a label signal;
selecting, as a part of the parameters, at least one valid path that is used as a valid connection path in the neural network for each node included in the [j]-th layer from a plurality of connection paths that connect the plurality of nodes included in the [j−1]-th layer and the plurality of nodes included in the [j]-th layer, respectively, based on the provisionally learned weight; and
learning, as a part of the parameters, at least one of a weight between the [j−1]-th layer and the [j]-th layer and a bias added in the [j]-th layer based on the sample signal, the label signal, and the at least one valid path.

28. A non-transitory recording medium on which a computer program executable by a computer to perform a signal transmission method is recorded,
the signal transmission method including:
generating a distortion compensation signal by performing a distortion compensation on an input signal by using a neural network that is defined by parameters determined by a parameter determination apparatus and that includes a plurality of layers that each include a plurality of nodes; and generating a transmission signal that is transmitted to a signal reception apparatus by performing a predetermined operation on the distortion compensation signal, the parameter determination apparatus configured to:

provisionally learn a weight between a [j−1]-th layer, where (j is an integer that satisfies a condition that 2≤j≤a number of the layers and a [j]-th layer to which an output of the [j−1]-th layer is inputted among the plurality of layers based on a sample signal and a label signal;

select, as a part of the parameters, at least one valid path that is used as a valid connection path in the neural network for each node included in the [j]-th layer from a plurality of connection paths that connect the plurality of nodes included in the [j−1]-th layer and the plurality of nodes included in the [j]-th layer, respectively, based on the provisionally learned weight; and learn, as a part of the parameters, at least one of a weight between the [j−1]-th layer and the [j]-th layer and a bias added in the [j]-th layer based on the sample signal, the label signal, and the at least one valid path.

29. A non-transitory recording medium on which a computer program executable by a computer to perform a signal transmission method is recorded, the signal transmission method including:

generating a distortion compensation signal by performing a distortion compensation on an input signal by using a neural network having a plurality of layers that each include a plurality of nodes;

generating a transmission signal that is transmitted to a signal reception apparatus by performing a predetermined operation on the distortion compensation signal;

provisionally learning a weight between a [j−1]-th layer, where j is an integer that satisfies a condition that 2≤j≤a number of the layers and a [j]-th layer to which an output of the [j−1]-th layer is inputted among the plurality of layers based on a sample signal and a label signal;

selecting, as a part of parameters, at least one valid path that is used as a valid connection path in the neural network for each node included in the [j]-th layer from a plurality of connection paths that connect the plurality of nodes included in the [j−1]-th layer and the plurality of nodes included in the [j]-th layer, respectively, based on the provisionally learned weight; and learning, as a part of the parameters, at least one of a weight between the [j−1]-th layer and the [j]-th layer and a bias added in the [j]-th layer based on the sample signal, the label signal, and the at least one valid path.

* * * * *